(12) United States Patent
Zhang et al.

(10) Patent No.: US 9,733,372 B2
(45) Date of Patent: Aug. 15, 2017

(54) METHOD AND SYSTEM FOR IDENTIFICATION OF GAS HYDRATES AND FREE GAS IN GEOLOGIC BEDS

(71) Applicant: Fugro Marine Geoservices, Inc., Houston, TX (US)

(72) Inventors: Zijian Zhang, Houston, TX (US); Daniel McConnell, Houston, TX (US)

(73) Assignee: Fugro Marine Geoservices, Inc., Houston, TX (US)

( * ) Notice: Subject to any disclaimer, the term of this patent is extended or adjusted under 35 U.S.C. 154(b) by 511 days.

(21) Appl. No.: 14/088,084

(22) Filed: Nov. 22, 2013

(65) Prior Publication Data

US 2014/0149042 A1 May 29, 2014

Related U.S. Application Data

(60) Provisional application No. 61/729,530, filed on Nov. 23, 2012.

(51) Int. Cl.
  *G01V 1/30* (2006.01)
(52) U.S. Cl.
  CPC ........ *G01V 1/301* (2013.01); *G01V 2210/614* (2013.01); *G01V 2210/62* (2013.01);
  (Continued)
(58) Field of Classification Search
  CPC . G01V 1/301; G01V 1/40; G01V 1/32; G01V 1/30; G01V 1/28; G01V 1/364; G01V 1/282; G01V 1/36; G01V 3/12; G01V 3/083; G01V 11/00; G01V 2210/614; G01V 2210/62; G01V 2210/64;
  (Continued)

(56) References Cited

U.S. PATENT DOCUMENTS 5,838,634 A   11/1998 Jones et al.
5,870,691 A * 2/1999 Partyka .................. G01V 1/301
              702/16

(Continued)

OTHER PUBLICATIONS

Notification concerning transmittal international preliminary report on patentability and written opinion of the international searching authority, of mailing date Jun. 4, 2015 based on International application No. PCT/US13/71523, 13 pages.

(Continued)

*Primary Examiner* — Manuel L Barbee
(74) *Attorney, Agent, or Firm* — Polsinelli PC

(57) ABSTRACT

A method and system for prospecting for gas hydrates and gas hydrates over free gas is disclosed. The method includes using well log data to form a rock physics model to generate synthetic seismic representing hydrate and hydrate-over-gas models. Spectral decomposition is applied to the synthetic seismic and to field seismic from the prospecting area, forming low frequency narrow band data sets. From mapped potential sands in the field data, compare positive amplitude dominated event in the narrow band field data to the narrow band synthetics for gas hydrates. Compare negative amplitude dominated event in the narrow band field data to the narrow band synthetics for gas or gas hydrate-over gas. From these comparisons, perform modeling to determine saturation and thickness for hydrates and hydrates-over-gas.

51 Claims, 12 Drawing Sheets

(52) U.S. Cl.
CPC .... *G01V 2210/64* (2013.01); *G01V 2210/647* (2013.01); *G01V 2210/66* (2013.01)

(58) Field of Classification Search
CPC ......... G01V 2210/647; G01V 2210/66; G01V 2210/60; G01V 2210/6161; G01V 2210/48; G01V 2210/51; G01V 2210/23; G01V 2210/6163; Y10S 367/911
See application file for complete search history.

(56) References Cited

U.S. PATENT DOCUMENTS

| | | | |
|---|---|---|---|
| 2003/0110018 A1 | 6/2003 | Dutta et al. | |
| 2005/0010366 A1 | 1/2005 | Castagna et al. | |
| 2007/0255499 A1 | 11/2007 | Strack et al. | |
| 2009/0306899 A1* | 12/2009 | Harris | G01V 3/12 702/13 |
| 2010/0270026 A1 | 10/2010 | Lazaratos et al. | |
| 2011/0292767 A1* | 12/2011 | Dai | G01V 1/282 367/73 |

OTHER PUBLICATIONS

Notification of transmittal of the international search report and the written opinion of the international searching authority, or the declaration of mailing date Feb. 19, 2014 based on International application No. PCT/US13/71523, 14 pages.

Zhang et al. Rock physics-based seismic trace analysis of unconsolidated sediments containing gas hydrate and free gas in Green Canyon 955, Northern Gulf of Mexico. Marine and Petroleum Geology 34, Nov. 25, 2011. Retrieved from the Internet at: http://ac.els-cdn.com/S0264817211002546/1-s2.0-S0264817211002546-mainpdf_tid=24ce2766-87bd-11-e3-8c7b-00000aab0f26&acdnat=1390873399_01e295d133a958ac57b01df30bb6f6ea. 15 pages.

Foster, Douglas J. et al: "Interpretation of AVO anomalies," Geophysics, Society of Exploration Geophysicists, US, vol. 75, No. 5, Sep. 1, 2010, pp. 75A3-75A13, XP001557869, ISSN: 0016-8033, DOI: 10.1190/1.3467825.

Castagna, John P. et al: "Principles of AVO Crossplotting", The Leading Edge, Society of Exploration Geophysicists, US, vol. 16, No. 4, Apr. 1, 1997 (Apr. 1, 1997), pp. 337-342, XP000690150, ISSN: 1070-485X, DOI: 10.1190/1.1437626.

Li, Yongyi et al: "Practical aspects of AVO modeling", The Leading Edge, Society of Exploration Geophysicists, US,vol. 26, No. 3, Mar. 1, 2007 (Mar. 1, 2007), pp. 295-296,298, XP001504876, ISSN: 1070-485X, DOI: 10.1190/1.2715053.

Communication of European Search Report issued Sep. 7, 2016 in co-pending European application No. 13850532.6 from European Patent Office, 11 pages.

Supplementary European Search Report, Jun. 9, 2016 based on European application No. 13856237, 9 pages.

M W Lee et al: "Seismic-attribute Analysis for Gas-hydrate and Free-gas Prospects on the North Slope of Alaska," The American Association of Petroleum Geologists, Jan. 1, 2009, pp. 541-555.

* cited by examiner

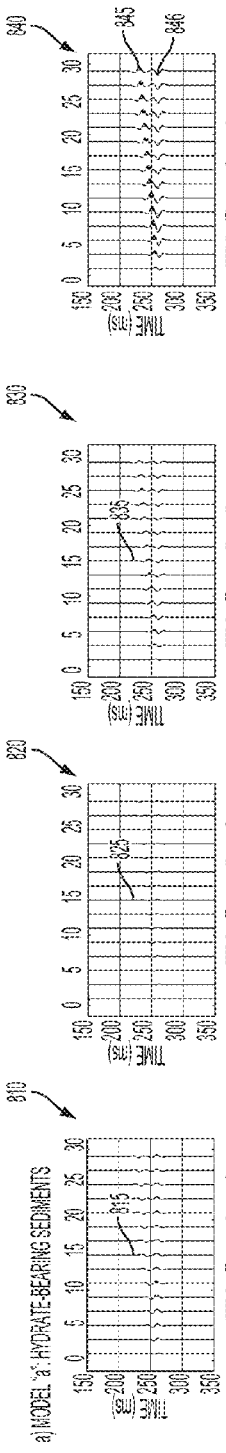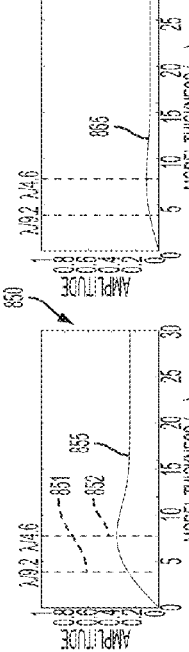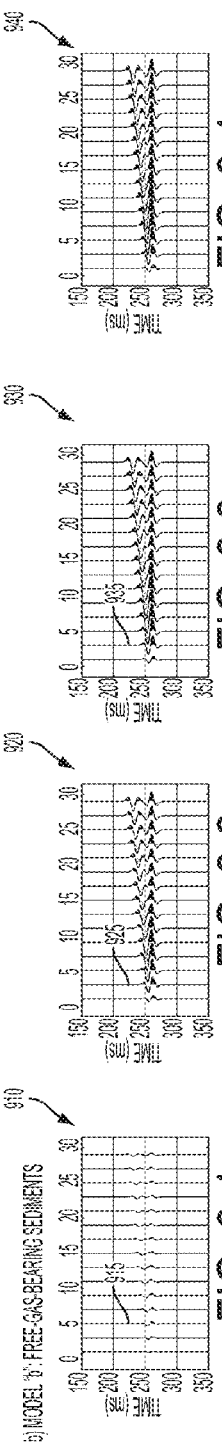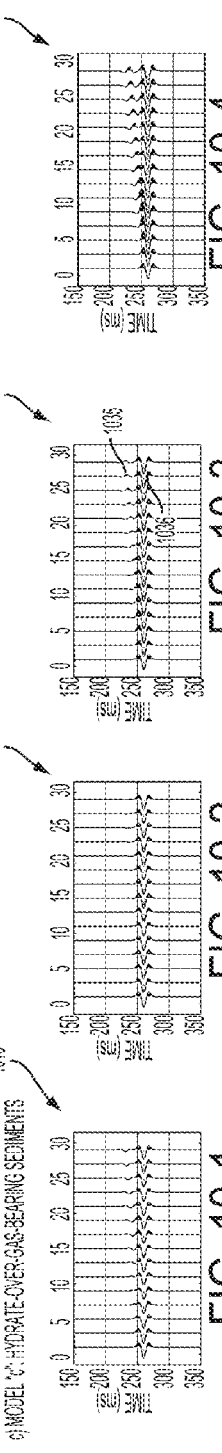

METHOD AND SYSTEM FOR IDENTIFICATION OF GAS HYDRATES AND FREE GAS IN GEOLOGIC BEDS

CROSS REFERENCE TO RELATED APPLICATIONS

This application claims the benefit of U.S. Provisional Application No. 61/729,530, filed Nov. 23, 2012.

BACKGROUND OF THE INVENTION

1. Field of the Invention

Examples of the subject matter disclosed herein generally relate to methods and systems for indicating the presence of gas hydrate and shallow gas associated with gas hydrate which includes the use of well log and seismic data, in particular methods for classifying and quantifying field seismic responses to gas hydrate and/or presence of associated shallow gas.

2. Discussion of Background

BRIEF SUMMARY OF THE INVENTION

In one set of examples, a method is disclosed for identifying gas hydrate saturation and associated free gas, the method including:

constructing a velocity-density-thickness model of background clays and target sands based on well log data and assuming that the target sands are saturated with water;

generating two sets of synthetic seismograms, a first set based on varying the sand thicknesses and hydrate saturation in the target sands of the model, and a second set based on varying the sand thickness, hydrate saturation, and an amount of free gas under the hydrate, in the target sands of the model;

in one preferred example, the two sets of synthetic seismograms are generated based on the dominant frequency of a field seismic data set;

applying spectral decomposition to a field seismic data set of the target sands, to narrow-band-limit the seismic data set;

applying spectral decomposition to the first set of synthetic seismograms (the "hydrate" set) to narrow-band-limit the first set of synthetic seismograms, in one preferred example, based on a frequency characteristic of the narrow-band-limited seismic data set;

applying spectral decomposition to the second set of synthetic seismograms (the "hydrate-over-gas" set) to narrow-band-limit the second set of synthetic seismograms, in one preferred example, based on a frequency characteristic of the narrow-band-limited seismic data set;

identifying the location(s) of the target sand(s) in the narrow-band-limited field seismic data, extracting a positive amplitude followed by a negative amplitude of the narrow-band-limit seismic data at the identified location(s);

classifying the extracted amplitudes based on whether the positive amplitude or the negative amplitude is dominant;

for extracted amplitudes where the positive amplitude is dominant, comparing the extracted amplitudes with the first set of narrow-band-limited synthetic seismograms (hydrate), and selecting the synthetic seismogram having the best match in thickness and amplitude to the extracted amplitude, and (in preferred one example), mapping the corresponding associated hydrate thickness and saturation represented by the selected synthetic seismogram to the field data location of the respective extracted amplitude;

for extracted amplitudes where the negative amplitude is dominant, comparing the extracted amplitudes with the second set of narrow-band-limited synthetic seismograms (hydrate-over-gas), and selecting the synthetic seismogram having the best match in thickness and amplitude to the extracted amplitude, and (in one preferred example), mapping the corresponding associated hydrate thickness and saturation and free gas amount represented by the selected synthetic seismogram to the field data location of the respective extracted amplitude.

It is to be appreciated that the field seismic data and synthetic seismograms are referenced as zero phase with North American polarity convention, where a decrease in impedance at an interface is negative with excursion to the left on a wiggle trace and an increase in impedance at an interface is positive with excursion to the right on a wiggle trace. Thus, the polarity convention is relative to zero phase data, positive indicating increasing impedance. For non-zero phase seismic data or synthetic seismograms an extraction step equivalent to extracting a positive amplitude followed by a negative amplitude can be applied.

To illustrate this equivalence, in one set of examples, the method for prospecting for gas hydrates includes extracting a portion of the narrow-band-limit seismic data at the identified locations and classifying the extracted portions based on whether a first phase characteristic or a second phase characteristic of the extracted portion is dominant. For extracted portions where the first phase characteristic is dominant, the extracted portions are compared with the first set of narrow-band-limited synthetic seismograms, and the synthetic seismogram of the first set having the best match is selected, whereby gas hydrate saturation is identified. For extracted portions where the second phase characteristic is dominant, the extracted portions are compared with the second set of narrow-band-limited synthetic seismograms, and the synthetic seismogram of the second set having the best match is selected, whereby gas hydrate saturation and associated free gas is identified. In a particular example, the first phase characteristic is a positive amplitude and the second phase characteristic is a following negative amplitude of the narrow-band-limit seismic data at the identified locations, the polarity convention relative to zero phase data, positive indicating increasing impedance.

In one set of examples, disclosed is a computer or computing system configured with executable programming code stored on a non-transient medium, executable to:

receive user input for, and constructing therefrom a velocity-density-thickness model of background clays and target sands based on well log data and assuming that the target sands are saturated with water;

receive user input for, and generating therefrom two sets of synthetic seismograms, a first set based on varying the sand thicknesses and hydrate saturation in the target sands of the model, and a second set based on varying the sand thickness, hydrate saturation, and an amount of free gas under the hydrate, in the target sands of the model;

in one preferred example, the two sets of synthetic seismograms are generated based on the dominant frequency of a field seismic data set;

receive user input for, and applying therefrom spectral decomposition to a field seismic data set of the target sands, to narrow-band-limit the seismic data set;

receive user input for, and applying therefrom spectral decomposition to the first set of synthetic seismograms (the "hydrate" set) to narrow-band-limit the first set of synthetic seismograms, in one preferred example, based on a frequency characteristic of the narrow-band-limited seismic data set;

receive user input for, and applying therefrom spectral decomposition to the second set of synthetic seismograms (the "hydrate-over-gas" set) to narrow-band-limit the second set of synthetic seismograms, in one preferred example, based on a frequency characteristic of the narrow-band-limited seismic data set;

receive user input for, and identifying therefrom the location(s) of the target sand(s) in the narrow-band-limited field seismic data, extracting a positive amplitude followed by a negative amplitude of the narrow-band-limit seismic data at the identified location(s);

receive user input for, and classifying therefrom the extracted amplitudes based on whether the positive amplitude or the negative amplitude is dominant;

for extracted amplitudes where the positive amplitude is dominant,
  comparing the extracted amplitudes with the first set of narrow-band-limited synthetic seismograms (hydrate), and
  selecting the synthetic seismogram having the best match in thickness and amplitude to the extracted amplitude, and
  (in one preferred example), mapping the corresponding associated hydrate thickness and saturation represented by the selected synthetic seismogram to the field data location of the respective extracted amplitude;

for extracted amplitudes where the negative amplitude is dominant,
  comparing the extracted amplitudes with the second set of narrow-band-limited synthetic seismograms (hydrate-over-gas), and
  selecting the synthetic seismogram having the best match in thickness and amplitude to the extracted amplitude, and
  (in one preferred example), mapping the corresponding associated hydrate thickness and saturation and free gas amount represented by the selected synthetic seismogram to the field data location of the respective extracted amplitude.

In one set of examples disclosed is a tangible computer readable medium having computer executable logic recorded thereon, including:

code for receiving user input for, and constructing therefrom a velocity-density-thickness model of background clays and target sands based on well log data and assuming that the target sands are saturated with water;

code for receiving user input for, and generating therefrom two sets of synthetic seismograms, a first set based on varying the sand thicknesses and hydrate saturation in the target sands of the model, and a second set based on varying the sand thickness, hydrate saturation, and an amount of free gas under the hydrate, in the target sands of the model;

code for receiving user input for, and applying therefrom spectral decomposition to a field seismic data set of the target sands, to narrow-band-limit the seismic data set;

code for receiving user input for, and applying therefrom spectral decomposition to the first set of synthetic seismograms (the "hydrate" set) to narrow-band-limit the first set of synthetic seismograms, in one preferred example, based on a frequency characteristic of the narrow-band-limited seismic data set;

code for receiving user input for, and applying therefrom spectral decomposition to the second set of synthetic seismograms (the "hydrate-over-gas" set) to narrow-band-limit the second set of synthetic seismograms, in one preferred example, based on a frequency characteristic of the narrow-band-limited seismic data set;

code for receiving user input for, and identifying therefrom the location(s) of the target sand(s) in the narrow-band-limited field seismic data, extracting a positive amplitude followed by a negative amplitude of the narrow-band-limit seismic data at the identified location(s);

code for receiving user input for, and classifying therefrom the extracted amplitudes based on whether the positive amplitude or the negative amplitude is dominant;

for extracted amplitudes where the positive amplitude is dominant,
  code for comparing the extracted amplitudes with the first set of narrow-band-limited synthetic seismograms (hydrate), and
  code for selecting the synthetic seismogram having the best match in thickness and amplitude to the extracted amplitude, and for extracted amplitudes where the negative amplitude is dominant,
  code for comparing the extracted amplitudes with the second set of narrow-band-limited synthetic seismograms (hydrate-over-gas), and
  code for selecting the synthetic seismogram having the best match in thickness and amplitude to the extracted amplitude.

In the above sets of examples, by further examples, a method, computer or computing system, or tangible computer readable medium includes method, executable programming code stored on a non-transient medium, or code for one or more of the following:

where the two sets of synthetic seismograms are generated based on the dominant frequency of a field seismic data set;

where the applying spectral decomposition to the first set of synthetic seismograms is based on a frequency characteristic of the narrow-band-limited seismic data set;

where the applying spectral decomposition to the second set of synthetic seismograms is based on a frequency characteristic of the narrow-band-limited seismic data set;

where, for extracted amplitudes where the positive amplitude is dominant, mapping the corresponding associated hydrate thickness and saturation represented by the selected synthetic seismogram to the field data location of the respective extracted amplitude;

where, for extracted amplitudes where the negative amplitude is dominant, mapping the corresponding associated hydrate thickness and saturation and free gas amount represented by the selected synthetic seismogram to the field data location of the respective extracted amplitude;

where the second set of synthetic seismograms comprise at least one synthetic seismogram having zero hydrate;

where constructing a model comprises assuming the sedimentary section to be an isotropic composite media of porous rock with isotropic mineral and fluid components, and gas hydrate;

where constructing a model comprises using the Hashin-Shtrikman lower bound to simulate elastic moduli of hydrate bearing sediments;

where constructing a model comprises using the Reuss average of hydrate and mineral components as higher limit of bound to simulate elastic moduli of hydrate bearing sediments;

where a model comprises using the Lee and Waite parameter ($\epsilon$) provided by Lee and Waite to describe both pore-filling and grain-contacted behavior;

where constructing a model comprises using the Walton smooth model to predict the elastic moduli of the dry rock matrix;

where constructing a model comprises using Gassmann's equation to predict the elastic moduli of fully water saturated sediment;

where constructing a model comprises using the Hashin-Shtrikman lower bound to compute the elastic moduli of the hydrated-bearing sands for hydrate present in the pore space;

where constructing a model comprises using Gassmann's equation to calculate elastic moduli of the free-gas-bearing sands for free gas present in the pore space;

where constructing a model comprises assuming uniform gas distribution and computing the fluid bulk modulus from the Reuss average of water and gas bulk moduli;

where constructing a model comprises computing the compressional-wave and shear-wave velocities from the well-log-derived moduli and densities.

BRIEF DESCRIPTION OF THE SEVERAL VIEWS OF THE DRAWING

FIGS. 8-1 through 8-4 illustrate synthetic seismograms showing the seismic response due various hydrate-bearing sediment thicknesses of the wedge model. FIG. 8-1 illustrates a synthetic seismogram for 0% gas hydrate. FIG. 8-2 illustrates a synthetic seismogram for 25% gas hydrate. FIG. 8-3 illustrates a synthetic seismogram for 50% gas hydrate. FIG. 8-4 illustrates a synthetic seismogram for 75% gas hydrate. FIGS. 8-5 through 8-8 illustrate graphical plots of synthetic seismic amplitude response versus wedge model thickness (of the hydrate-bearing sediments).

FIGS. 9-1 through 9-4 illustrate synthetic seismograms showing the seismic response due various free-gas-bearing sediment thicknesses of the wedge model. FIG. 9-1 illustrates a synthetic seismogram for 0% free-gas saturation. FIG. 9-2 illustrates a synthetic seismogram for 25% free-gas saturation. FIG. 9-3 illustrates a synthetic seismogram for 50% free-gas saturation. FIG. 9-4 illustrates a synthetic seismogram for 75% free-gas saturation.

FIGS. 10-1 through 10-4 illustrate synthetic seismograms showing the seismic response due various hydrate-bearing sediment thicknesses of the wedge model, underlain by a free-gas-bearing zone with uniform free-gas saturations of 30%. FIG. 10-1 illustrates a synthetic seismogram for 0% gas hydrate over 30% free gas. FIG. 10-2 illustrates a synthetic seismogram for 25% gas hydrate over 30% free gas. FIG. 10-3 illustrates a synthetic seismogram for 50% gas hydrate over 30% free gas. FIG. 10-4 illustrates a synthetic seismogram for 75% gas hydrate over 30% free gas.

FIGS. 11-1 and 11-2 illustrate a frequency versus thickness density plot of relative energy strength based on Fourier spectra of the generated synthetic seismogram. FIG. 11-1 illustrates a frequency versus thickness density plot 1110 based on the Fourier spectra of the model "(a)" 507 with 75% hydrate saturation (FIG. 8-4, seismogram 840). FIG. 11-2 illustrates a frequency versus thickness density plot 1120 based on the Fourier spectra of the model "(a)" 707 with 75% hydrate saturation over a 30% gas saturated sand (FIG. 10-4, seismogram 1040).

FIGS. 12-1 and 12-2 illustrate a 12 Hz Fourier amplitude versus thickness plots of relative energy strength based on Fourier spectra at 12 Hz of the generated synthetic seismograms. FIG. 12-1 illustrates a 12 Hz Fourier amplitude versus thickness plot "(a)" 1210 based on the Fourier spectra at 12 Hz of the model "(a)" 500 with curves for 0% through 100% gas hydrate saturation. FIG. 12-2 illustrates a 12 Hz Fourier amplitude versus thickness plot "(b)" 1220 based on the Fourier spectra at 12 Hz of the model "(c)" 700 with curves for 0% through 100% gas hydrate saturation with 30% free gas saturation below the gas hydrate-bearing layer.

FIGS. 13-1 through 13-6 illustrate cross-section view normalized amplitudes of the waveform peak reflector for the interpreted top of the gas hydrate-bearing layer versus lateral distance, each cross section representing a (vertical) zone of interest.

FIGS. 14-1 and 14-2 illustrate example synthetic stacked seismic sections with overlaying well log data. FIG. 14-1 illustrates an example synthetic stacked seismic section with overlaying well log data and three prospective hydrate zones identified. FIG. 14-2 illustrates an example synthetic stacked seismic section with overlaying well log data and three prospective hydrate zones identified, showing detail of the bedding in the zones.

DETAILED DESCRIPTION

Figure 1:
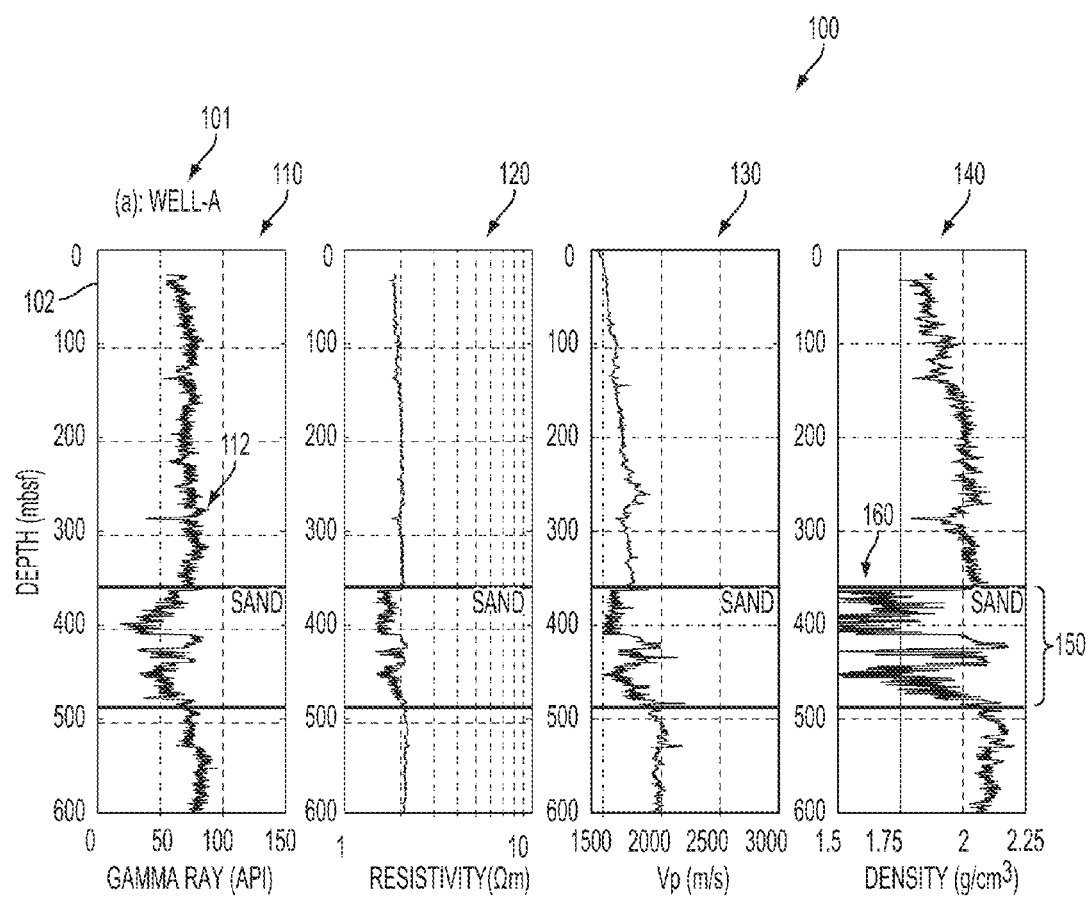
FIG. 1 discloses depth plots from a geophysical well log 100 indicating a thick sand zone, the well log including Gamma Ray, Resistivity, Vp and Density curves.

U.S. Provisional Application No. 61/729,530, filed Nov. 23, 2012 for METHOD AND SYSTEM FOR IDENTIFICATION OF GAS HYDRATES AND FREE GAS IN GEOLOGIC BEDS by Zijian Zhang and Daniel McConnell is herein incorporated by reference in its entirety.

Gas hydrate is an ice-like crystalline solid consisting of gas molecules enclosed by cages of water molecules (Sloan, 1998). Although gas hydrate is estimated to be the largest global reservoir of hydrocarbons (Kvenvolden, 1993), most natural hydrate accumulations are characterized by relatively low concentrations (low energy density) and are disseminated in the sediments as grains and nodules of various sizes. On the other hand, highly concentrated thick gas hydrate-bearing sand layers in Polar Regions and in deepwater continental slope environments may be an exploitable energy source (Boswell, 2009).

Disclosed herein are examples of an integrated interpretation method for the detection and characterization of highly concentrated hydrate-bearing reservoirs. well logs have been used to identify and characterize gas hydrate in various geologic settings but they provide information on only the area immediately surrounding each well. Seismic data can delineate structures and conventional seismic prospecting techniques and have been used to identify potential gas hydrate accumulations, with some degree of certainty. Disclosed herein are examples of integration of logging and seismic data, providing a more robust interpretation of gas hydrate presence and distribution. In particular examples, logging data and seismic data are linked through rock physics modeling.

One of the main goals in a gas hydrate reservoir exploration and characterization is to discriminate sands from clays and, preferably, to separate highly concentrated hydrate-bearing sands from water-bearing sands and from free-gas-bearing sands. Clays inter-bedded with discrete sands comprise most of the sediments in the deepwater Gulf of Mexico.

Gas hydrates refer to naturally occurring solid composed of crystallized water (ice) molecules containing molecules of natural gas, which may be mainly methane and higher order hydrocarbons. When the term hydrate is used in the context of this application, gas hydrates are meant.

A field seismic data set, when used herein, is meant to distinguish seismic data which was acquired by seismic waves travelling through the earth from seismic data that is artificially generated from conceptual models without using seismic waves travelling through the earth. A field seismic data set, when used herein, may be processed by computing devices, such as application of sorting into common midpoint gathers and/or application of various filters, mutes, deconvolution, stacking, and/or normal moveout correction.

A hydrate-bearing sediment, when used herein, means a sediment that contains gas hydrate.

Hydrate-bearing sediments in water-bearing sediments, when used herein, means a portion of a sequence of sediments bears gas hydrates, while a portion over or under the gas hydrate portion bears water.

A gas hydrate-bearing sand layer in clay, when used herein, means a sand layer bearing gas hydrates that has clay sediments over or under the sand layer.

Free-gas-bearing sediments, when used herein, means sediments that contain gas in the pore volume, the gas being free in that it is not bound as a hydrate.

Free-gas-bearing sediments in water-bearing sediments, when used herein, means sediments that contain gas in the pore volume, the gas being free in that it is not bound as a hydrate and the sediments also contain water in the pore volume.

Over-free-gas-bearing sediments, when used herein, means sediments that are over sediments that contain gas in its pore volume, the gas being free in that it is not bound as a hydrate.

Hydrate-bearing sediment over-free-gas-bearing sediment, when used herein, means a sediment that contains gas hydrate that are over sediments that contain gas in its pore volume, the gas being free in that it is not bound as a hydrate.

Hydrate-bearing sand layer with a clay cap and free gas below, when used herein, means a sediment that contains gas hydrate that are over sediments that contain gas in its pore volume, the gas being free in that it is not bound as a hydrate and also are under a clay sediment.

The word geology, when used as a noun, is known to mean the structure of a specific region of the earth's crust.

A rock physics model is a representation of geologic lithology and/or stratigraphy which typically includes information relating to the physical and acoustic properties of geologic units. For example, Vp, Vs, density, porosity, thickness, sand content, clay content, water content, gas content, gas hydrate content, layering, mineralogy, saturation, pore fill type are just examples of information that may be contained in a rock physics model. A velocity-density-thickness model is a rock physics model that includes information related to the velocity, density, and/or thickness of geologic units. In one example, a rock physics model is a model of physical parameters representing a geology.

FIG. 1 discloses a log view of a well log 100 indicating a thick sand zone, the well log including Gamma Ray, Resistivity, Vp and Density curves. Well log 100 illustrates typical Gulf of Mexico well-log data: gamma ray 110, resistivity 120, compressional-wave (Vp) acoustic 130, and density 140 logs (curves) from a well: well-A 101, showing a thick sand zone 150. The vertical axis 102 of the log curves is shown in meters below sea floor (msbf). The horizontal axes show the log curves' respective measurement scale, namely, API for Gamma Ray 110, ohm-meter for Resistivity 120, meters per second for Vp 130 (velocity of compressional wave), and grams per cubic centimeter for Density 140. As illustrated, the low density values 160 in the non-hydrate-bearing portion of sand-rich section are probably produced by borehole washout (Guerin et al., 2009).

Figure 2:
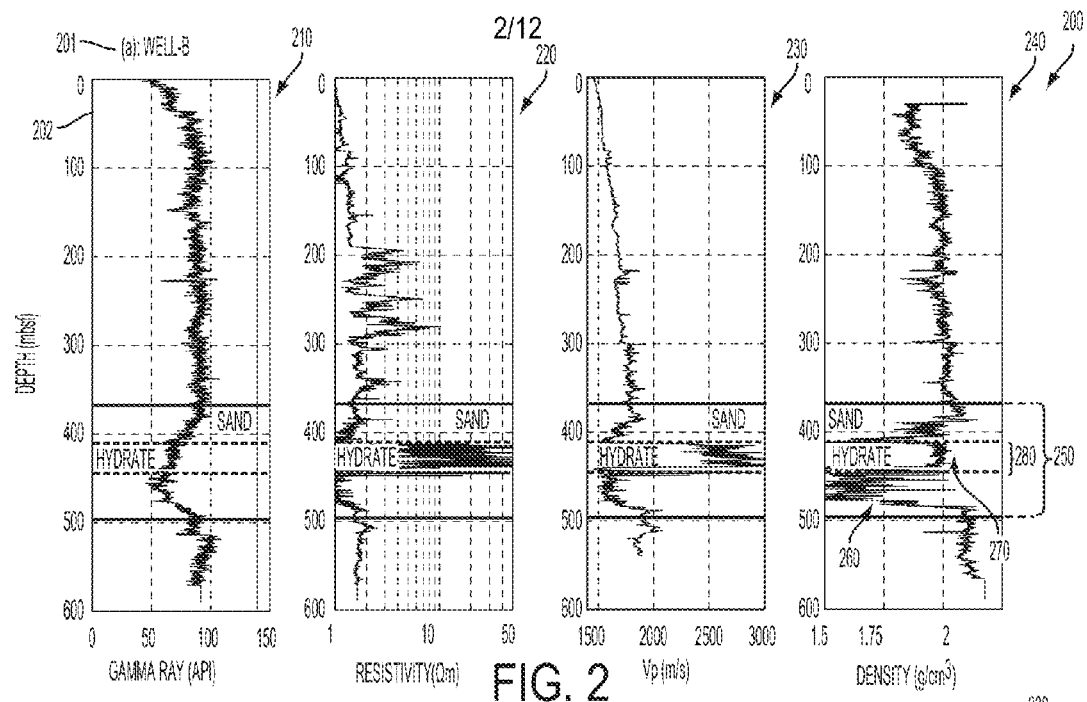
FIG. 2 discloses depth plots from a geophysical well log 200 indicating highly concentrated gas hydrate within sand-rich section, the well log including Gamma Ray, Resistivity, Vp and Density curves.

FIG. 2 discloses a log view of a well log 200 indicating highly concentrated gas hydrate within sand-rich section, the well log including Gamma Ray, Resistivity, Vp and Density curves. Well log 200 illustrates typical Gulf of Mexico well-log data: gamma ray 210, resistivity 220, compressional-wave (Vp) acoustic 230, and density 240 logs (curves) from a well: well-B 201, showing highly concentrated gas hydrate 280 within sand-rich section 250. The vertical axis 202 of the log curves is shown in meters below sea floor (msbf). The horizontal axes show the log curves' respective measurement scale, namely, API for Gamma Ray 210, ohm-meter for Resistivity 220, meters per second for Vp 230 (velocity of compressional wave), and grams per cubic centimeter for Density 240. Note that the density log curve 240 is good quality 270 in the hydrate-bearing portion 280 of sand-rich section 250. The low density values 260 in the non-hydrate-bearing portion of sand-rich section 250 are probably produced by borehole washout (Guerin et al., 2009).

Figure 3:
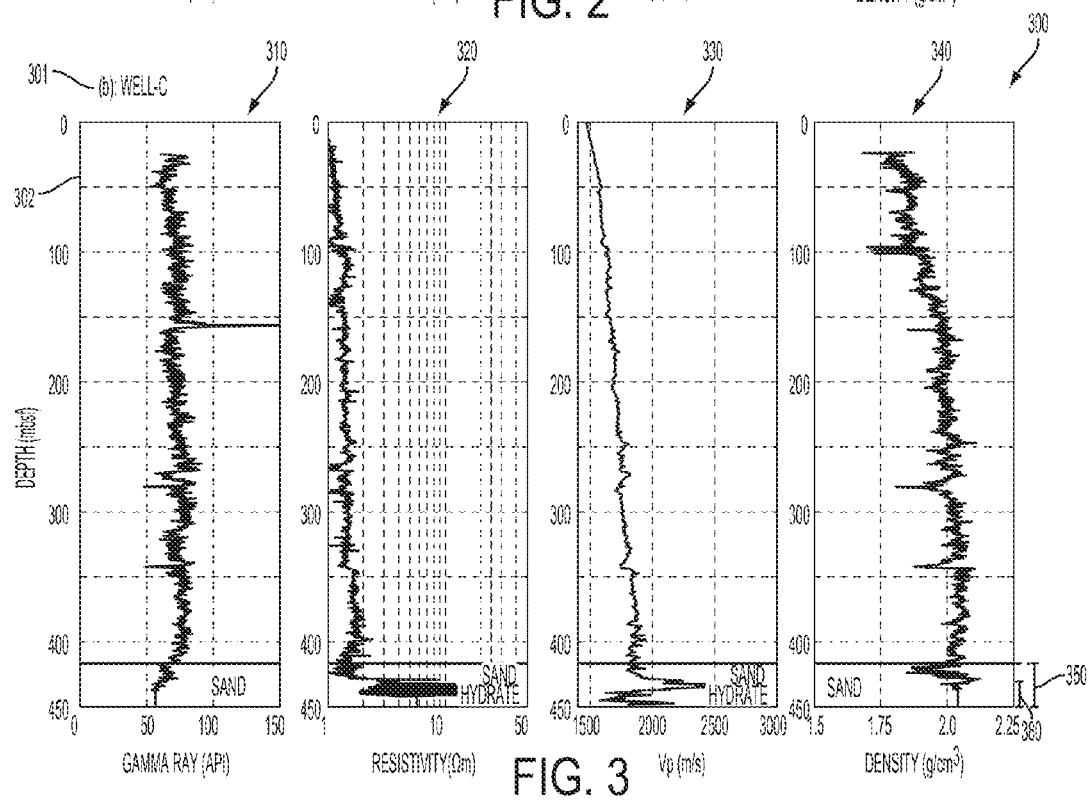
FIG. 3 discloses depth plots from a geophysical well log 300 indicating highly concentrated gas hydrate within sand-rich section, the well log including Gamma Ray, Resistivity, Vp and Density curves.

FIG. 3 discloses a log view of a well log 300 indicating highly concentrated gas hydrate within sand-rich section, the well log including Gamma Ray, Resistivity, Vp and Density curves. Well log 300 illustrates typical Gulf of Mexico well-log data: gamma ray 310, resistivity 320, compressional-wave (Vp) acoustic 330, and density 340 logs (curves) from a well: well-C 301, showing highly concentrated gas hydrate 380 within sand-rich section 350. The vertical axis 302 of the log curves is shown in meters below sea floor (msbf). The horizontal axes show the log curves' respective measurement scale, namely, API for Gamma Ray 310, ohm-meter for Resistivity 320, meters per second for Vp 330 (velocity of compressional wave), and grams per cubic centimeter for Density 340.

Figure 4:
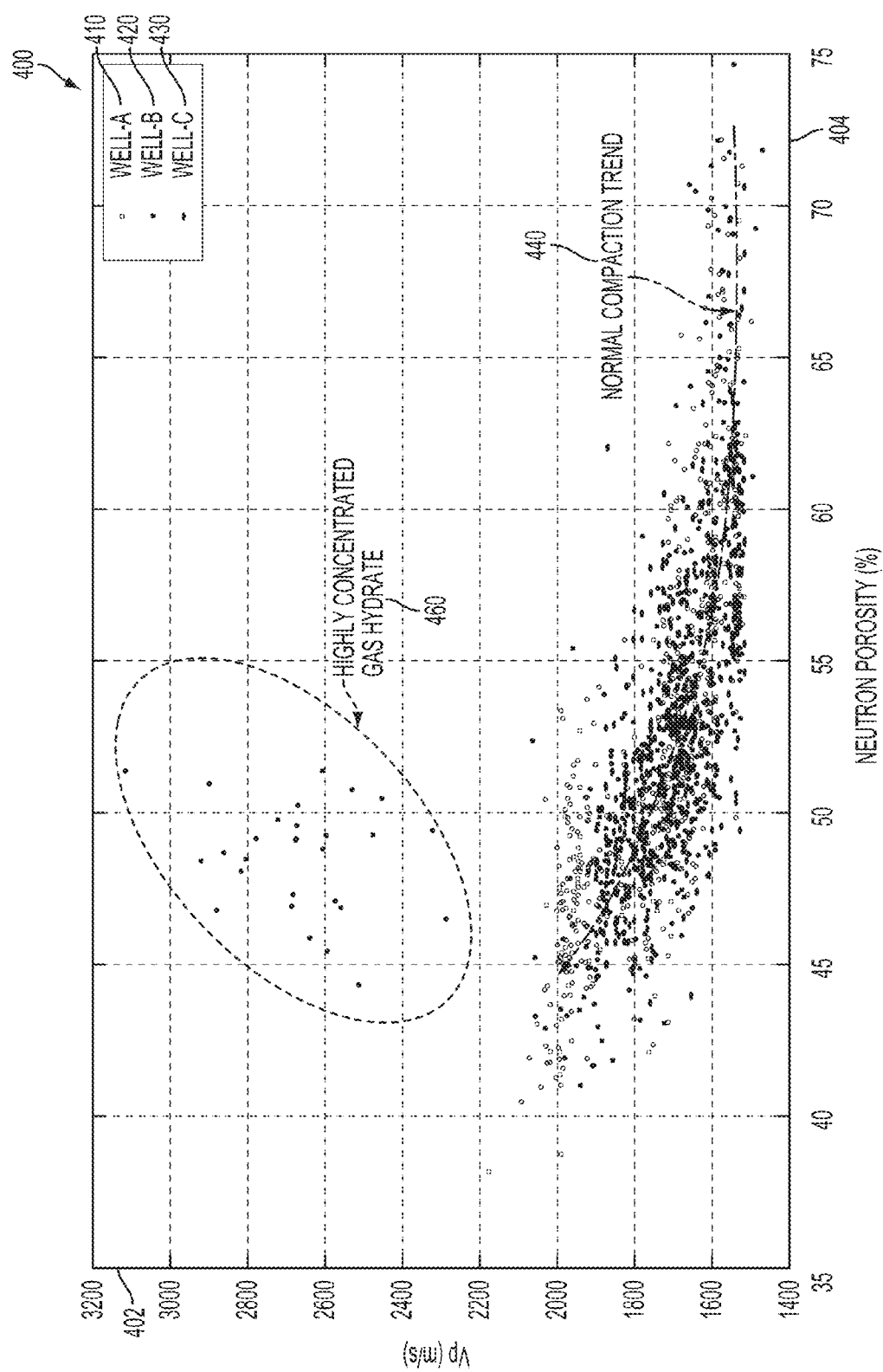
FIG. 4 discloses a cross-plot graph view of Vp versus Neutron Porosity (%) values from well logs 100, 200, 300.

FIG. 4 discloses a cross-plot graph 400 view of Vp versus Neutron Porosity (%) values from well logs 100, 200, 300. The figures of Sheet 3 illustrate typical Gulf of Mexico well-log data: compressional-wave velocity versus neutron porosity from wells well-A 101, well-B 201, and well-C 301, showing normal compaction trend 440 (Hamilton, 1971) and high velocity gas-hydrate-bearing sands 460. The vertical axis 402 is shown in meters per second and represents the extracted velocity value from Vp log curves 130, 230, 330.

The horizontal axis 404 is shown in neutron porosity measurement, in percent. For a given depth below sea floor, a velocity value is extracted from Vp log curve 130, 230, 330 along with a corresponding porosity measurement, in percent, for that depth. The values are marked on crossplot 400. Extracted data values 410 from curve values for log 100 of well A 101 are shown with an open circle indicator on crossplot 400. Extracted data values 420 from curve values for log 200 of well B 201 are shown with a closed circle indicator on crossplot 400. Extracted data values 410 from curve values for log 300 of well C 301 are shown with an small circle indicator on crossplot 400.

From the crossplot 400, it can be seen that cross-plot values associated with normal compaction trend 440, in this example, range from 70+% to 40% Neutron Porosity, with Vp trending from 1550 meters per second to 2000 meters per second. From the crossplot 400, it can be seen that high velocity gas-hydrate-bearing sands 460 cluster, in this example, between 45% and 55% Neutron Porosity, and exhibit Vp in the 2200 to 3200 meter per second range.

In general, each of these wells 101, 201, 301 is characterized by a relatively thick stratigraphic section extending from the seafloor to a depth below 300 mbsf that is characterized by relatively high gamma ray log values of 70 API and higher 112, 212, 312, which suggests clay-dominated sediments. Within the more deeply buried log-inferred gamma ray sand-rich sections, the gamma ray log drops to about 25 API (not illustrated).

Rock physics depth trends can be complicated by varying lithology, mineralogy, fluid properties, and pore pressure conditions (Avseth et al., 2005). In general, acoustic impedance of shallow sediments increases with depth due to compaction. Close to the seafloor, sands have higher impedance than clays because clays tend to have higher water content than sands. However, the porosity of clays decreases faster with depth than that of sands in the very shallow section because clays tend to compact more easily during early burial (Velde, 1996). The impedance of clays tends to increase more quickly than that of sands. Thus, an impedance crossover of sands and clays may occur in the shallow section. Below the crossover, clays have higher impedance. Neidell and Berry (1989) observe that the impedance of shallow unconsolidated Pleistocene sands is lower than that of associated clays. Hilterman (2001) illustrates that the impedance of sands is less than clays from very shallow section to 4,000 mbsf in Gulf of Mexico. FIG. 4 illustrates an example of a normal compaction trend 440 for an exploration area. It is speculated that the sediment induced impedance crossover occurs at a shallow depth in this example area. Within the gas hydrate-bearing sedimentary section of our interest in this example area, from 350 to 700 mbsf, the acoustic impedance of sands is less than that of clays.

In examples, impedance trends in hydrate bearing sands are described by a rock physics-based gas hydrate model that derives a physics-based relationship between hydrate saturation and elastic properties of sediments (Vp, Vs and density). In further examples, effective media, contact models, and fluid substitution theories are all used to create the rock physics model. In one example, fundamental principles and equations are presented by Mavko et al. (2009) and have also been used by Lee et al. (2009) to conduct similar inversions of gas hydrate accumulations in northern Alaska. In some examples, the sedimentary section is assumed to be an isotropic composite media of porous rock with isotropic mineral and fluid components, and gas hydrate. The mineral components include mostly clays and silica-rich sands; the fluid components are water and gas. In further examples, it is assumed that gas hydrate and free gas generated in the pore space of sands reduce the water-filled porosity but that the total pore space does not change (Lee and Collett, 2001). The hydrate that fills the pore space partially acts as a component of fluid and partially acts as a component of the mineral frame. This behavior has been observed in laboratory studies (Buffett and Zatespina, 2000; Yun et al., 2005; Winters et. al., 2004; Priest et al., 2009).

In examples, the Hashin-Shtrikman lower bound is used to simulate elastic moduli of hydrate bearing sediments (Mavko et al. 2009). The lower limit of the bound for effective elastic moduli is water saturated sediment without any hydrate. In further example, the higher limit of the bound used is the Reuss average of hydrate and mineral components (Helgerud et al., 1999; Han and Batzle, 2004). It is suggested that at low gas hydrate saturations, hydrate floats in the pore space and is considered to be in suspension. When hydrate saturation increases, the hydrate becomes grain supported. Gas hydrate has both pore-filling and grain-contacted behaviors at relatively high gas hydrate saturation. In further example, the parameter ($\epsilon$) provided by Lee and Waite (2008) is used to describe both pore-filling and grain-contacted behavior.

In examples, the "Walton smooth model" is used to predict the elastic moduli of the "dry rock" matrix and Gassmann's equation is used to predict the elastic moduli of fully water saturated sediment (Mavko et al., 2009). Table 1 illustrates examples of the elastic constants used for the calculation. In further example, if gas hydrate is present in the pore space, the Hashin-Shtrikman lower bound is used to compute the elastic moduli of the hydrated-bearing sands; if free gas is present, Gassmann's equation is used to calculate elastic moduli of the free-gas-bearing sands. In further examples, uniform gas distribution is assumed and the fluid bulk modulus is computed from the Reuss average of water and gas bulk moduli (Helgerud et al., 1999). Finally, the compressional- and shear-wave velocities are computed from the well-log-derived moduli and densities.

TABLE 1

Example elastic constants for components of sediments

| Component | $\rho$, g/cm$^3$ | K, GPa | G, GPa |
|---|---|---|---|
| sand | 2.65 | 36 | 45 |
| Clay | 2.58 | 20.9 | 6.85 |
| Hydrate | 0.91 | 7.7 | 3.2 |
| Water | 1.02 | 2.29 | 0 |

Widess (1973) shows that normal incident acoustic amplitudes and waveforms from an isolated thin bed change with the thickness of the bed until the bed reaches a certain thickness. At the lower thickness limit, the amplitude increases as the thickness increases because of constructive wavelet interference in the thin layer. The maximum amplitude occurs when the thickness reaches one-fourth of the predominant wavelength ($\lambda/4$), which is called the tuning thickness. As the layer thickens to $\lambda/2$, the amplitude decreases until it reaches the original non-interfering amplitude of the layer reflection coefficient.

Figure 5:
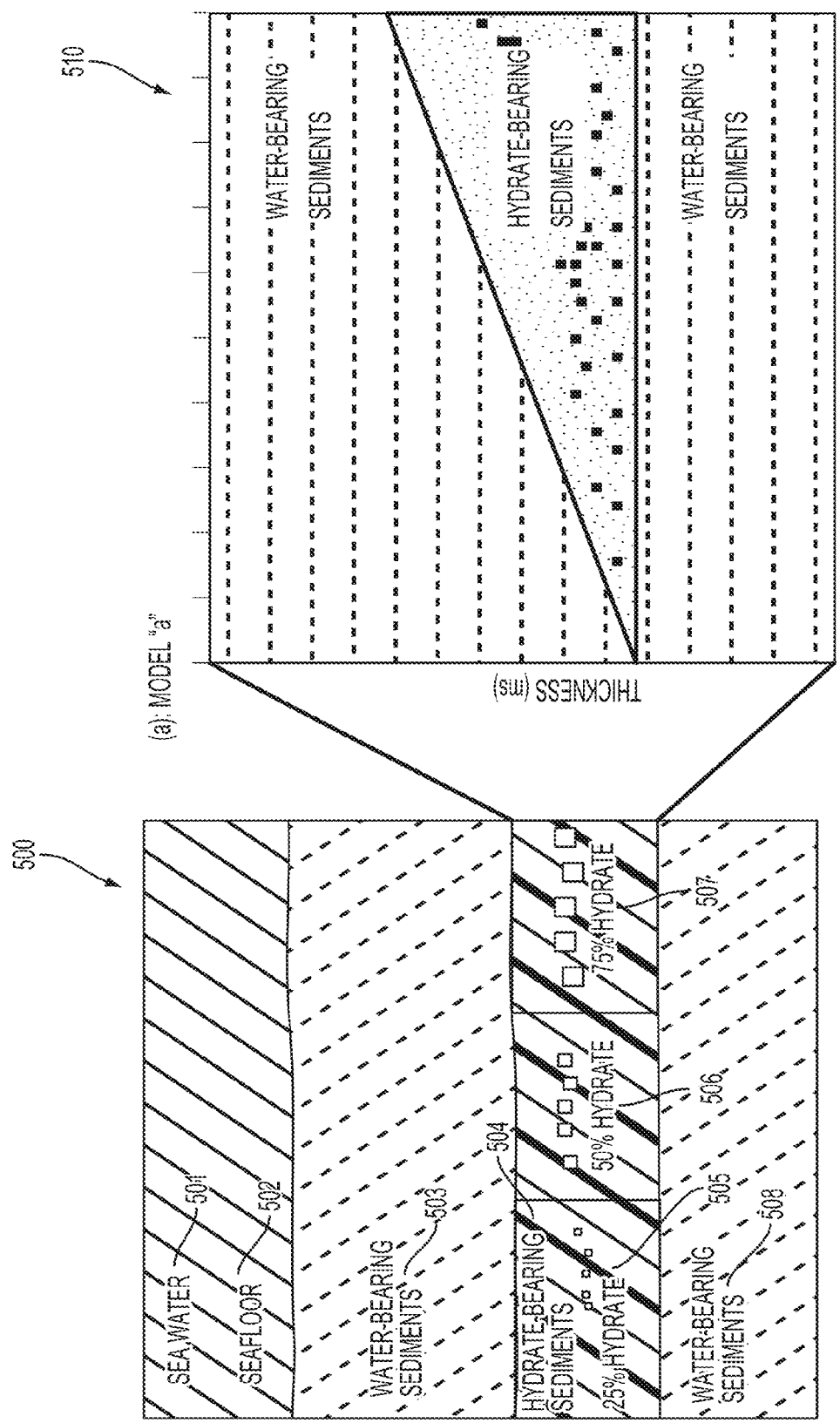
FIG. 5 discloses a model "a" schematic geologic cross-section representing a wedge of hydrate-bearing sediments in water-bearing sediments.
Figure 6:
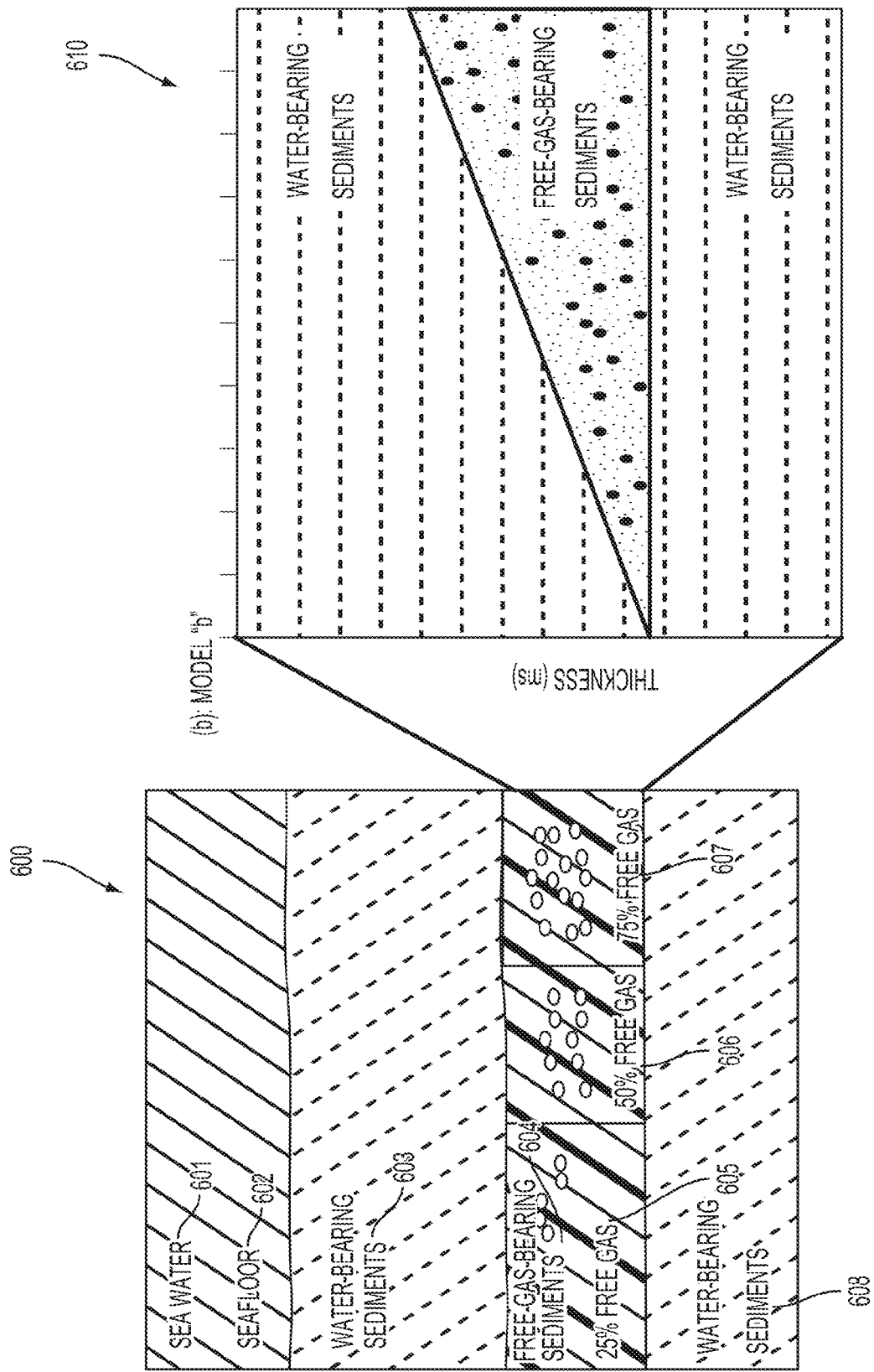
FIG. 6 discloses a model "b" schematic geologic cross-section representing a wedge of free-gas-bearing sediments in water-bearing sediments.
Figure 7:
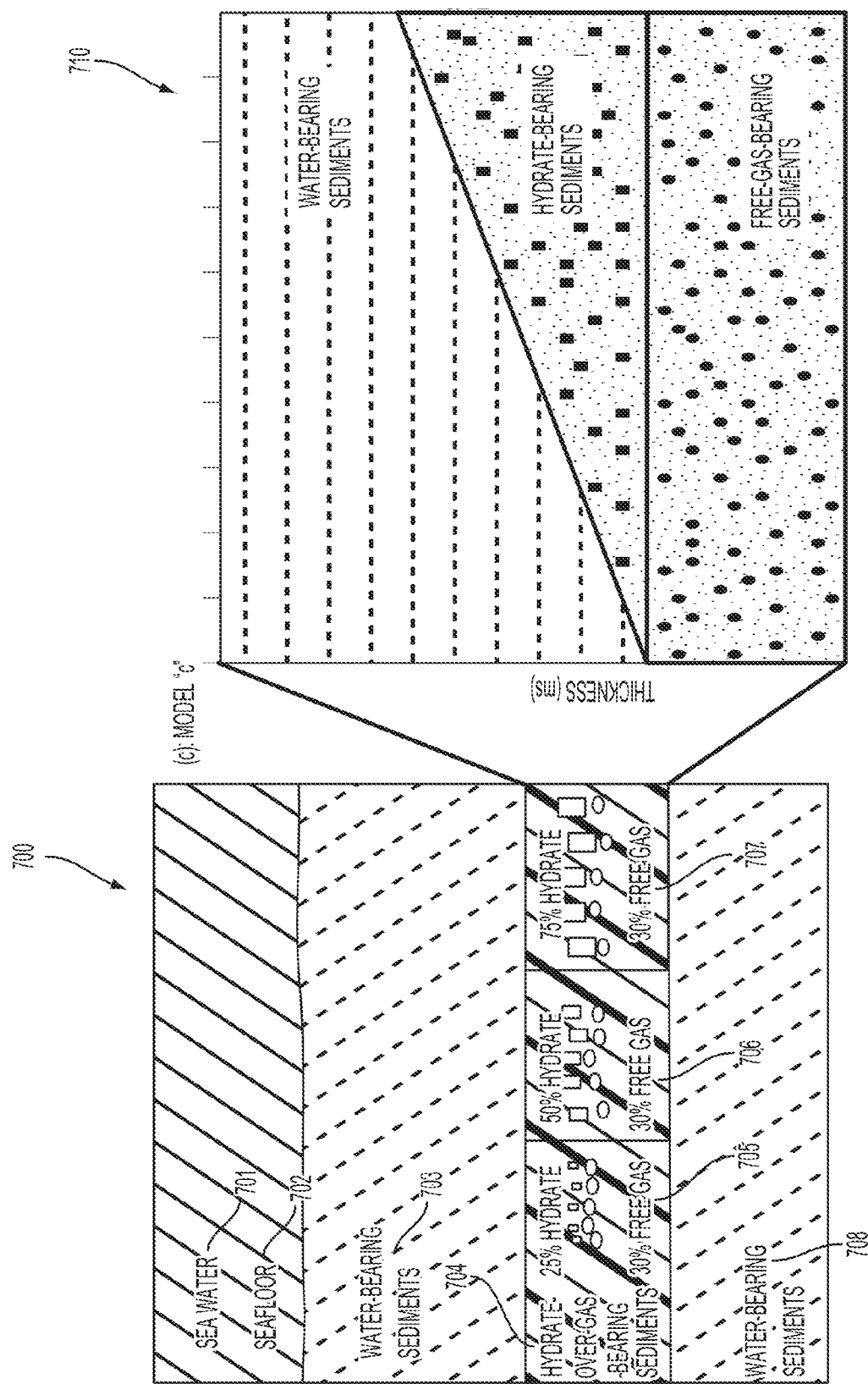
FIG. 7 discloses a model "c" schematic geologic cross-section representing a wedge of hydrate-bearing sediments overlaying free-gas-bearing sediments.

FIG. 5, FIG. 6, and FIG. 7 illustrate construction of three sand wedge models, "(a)", "(b)", and "(c)", with various gas hydrate and free gas saturation levels, constructed to determine the effect on acoustic amplitudes as a product of reservoir thicknesses and saturations of gas-hydrate-, free-gas- and water-bearing sand reservoirs.

It is to be appreciated that the field seismic data and synthetic seismograms are referenced as zero phase with North American polarity convention, where a decrease in impedance at an interface is negative with excursion to the left on a wiggle trace and an increase in impedance at an interface is positive with excursion to the right on a wiggle trace.

FIG. 5 discloses a model "a" schematic geologic cross-section 500 representing a wedge 510 of hydrate-bearing sediments in water-bearing sediments. Model "(a)" represents a wedge model 510 for hydrate-bearing sediment. In some examples, model "(a)" is a three-layer model of a gas hydrate-bearing sand layer in clay. In some examples, the thickness of wedge varies from 0 to 30 ms (milliseconds). Cross-section 500 illustrates a schematic model of horizontal sediments beneath sea water 501 and a sea floor 502. A first zone 503 of water-bearing sediments lies horizontally between the sea floor 502 and a second zone 504 of hydrate bearing sediments. Second zone 504 of hydrate bearing sediments, in turn, lies horizontally between the bottom of first zone 503 and a third zone 508 of water-bearing sediments. In one example, second zone 504 of hydrate bearing sediments is schematically divided into three saturations: a 25% hydrate saturation 505, a 50% hydrate saturation 506, and a 75% hydrate saturation 507. Each hydrate saturation 505, 506, 507 is a variation for use in wedge model 510.

FIG. 6 discloses a model "b" schematic geologic cross-section 600 representing a wedge 610 of free-gas-bearing sediments in water-bearing sediments. Model "(b)" represents a wedge model 610 for free-gas-bearing sediment. In some examples, model "(b)" is a three-layer model of a gas-bearing sand layer in clay. In some examples, the thickness of wedge varies from 0 to 30 ms (milliseconds). Cross-section 600 illustrates a schematic model of horizontal sediments beneath sea water 601 and a sea floor 602. A first zone 603 of water-bearing sediments lies horizontally between the sea floor 602 and a second zone 604 of hydrate bearing sediments. In a preferred example, first zone 603 is equivalent to first zone 503. Second zone 604 of free-gas-bearing sediments, in turn, lies horizontally between the bottom of first zone 603 and a third zone 608 of water-bearing sediments. In one example, second zone 604 of free-gas-bearing sediments is schematically divided into three saturations: a 25% free gas saturation 605, a 50% free gas saturation 606, and a 75% free gas saturation 607. Each free gas saturation 605, 606, 607 is a variation for use in wedge model 610. In a preferred example, third zone 608 is equivalent to third zone 508.

FIG. 7 discloses a model "c" schematic geologic cross-section 700 representing a wedge 710 of hydrate-bearing sediments over-free-gas-bearing sediments. Model "(c)" represents a wedge model 710 for hydrate-bearing sediment over-free-gas-bearing sediment. In some examples, model "(c)" is a hydrate-bearing sand layer with a clay cap and free gas below. In some examples, the thickness of wedge varies from 0 to 30 ms (milliseconds). Cross-section 700 illustrates a schematic model of horizontal sediments beneath sea water 701 and a sea floor 702. A first zone 703 of water-bearing sediments lies horizontally between the sea floor 702 and a second zone 704 of hydrate bearing sediments. In a preferred example, first zone 703 is equivalent to first zone 503. Second zone 704 of hydrate bearing sediments, in turn, lies horizontally between the bottom of first zone 703 and a third zone 708 of free-gas-bearing sediments. In one example, second zone 704 is equivalent to second zone 604.

In one example, second zone 704 of hydrate bearing sediments is schematically divided into three saturations: a 25% hydrate saturation 705, a 50% hydrate saturation 706, and a 75% hydrate saturation 707. In one example, 30% free-gas saturation is used for each hydrate saturation. Each hydrate saturation 705, 706, 707 is a variation for use in wedge model 710. In a preferred example, third zone 708 is equivalent to third zone 508.

FIGS. 8-1 through 8-4, FIGS. 9-1 through 9-4, and FIGS. 10-1 through 10-4 illustrate generation of synthetic seismic diagrams (synthetic seismograms) 810, 820, 830, 840, 910, 920, 930, 940, 1010, 1020, 1030, 1040 based on the three sand wedge models, "(a)" 510, "(b)" 610, and "(c)" 710, with various gas hydrate and free gas saturation levels, generated to determine the effect on acoustic amplitudes as a product of reservoir thicknesses and saturations of gas-hydrate-, free-gas- and water-bearing sand reservoirs.

In example, synthetic seismic diagrams are generated from the wedge models for hydrate- and gas-bearing sediments and hydrate-over-gas bearing sediments. In one example, a Ricker wavelet of 50 Hz dominant frequency is used to generate zero-offset synthetic seismic data. In one example, the P-wave velocity of the clay is set to 1,810 m/s. In one example, the density is set to 2.06 g/cc. In one example, the elastic properties of water-bearing sand, hydrate-bearing sand and free-gas-bearing sand are derived from the well log data and the rock physics model.

FIGS. 8-1 through 8-4 illustrate synthetic seismograms showing the seismic response due various hydrate-bearing sediment thicknesses of the wedge model, for example, wedge model 510 of model "a" geologic cross section 500. In particular, FIG. 8-1, seismogram 810, illustrates seismic response of a wedge model using 0% hydrate saturation. A seismic response wavelet 815 is labeled for reference. FIG. 8-2, seismogram 820, illustrates seismic response of a wedge model using 25% hydrate saturation. A seismic response wavelet 825 is labeled for reference. FIG. 8-3, seismogram 830, illustrates seismic response of a wedge model using 50% hydrate saturation. A seismic response wavelet 835 is labeled for reference. FIG. 8-4, seismogram 840, illustrates seismic response of a wedge model using 75% hydrate saturation.

FIGS. 8-5 through 8-8 illustrate graphical plots of synthetic seismic amplitude response 855 versus wedge model thickness (of the hydrate-bearing sediments). In one example, model "(a)" also includes plots of amplitude verses thickness, plots 850, 860, 870. The vertical axis of each of plots 850, 860, 870 is synthetic seismic amplitude response, plotted against a horizontal axis of model thickness in ms (milliseconds). For reference, two wedge model thicknesses are denoted in terms of acoustic wavelength of the dominant frequency of the Ricker wavelet: a vertical line 851 at $\lambda/9.2$ and a vertical line 852 at $\lambda/4.6$. Corresponding vertical lines are denoted on plot 860 (861 and 862), plot 870 (871 and 872), and plot 880 (881 and 882).

In an example for model "(a)" 510 (FIGS. 8-1 through 8-4, seismograms 810, 820, 830, 840), the highest amplitudes occur with high hydrate saturations in hydrate-bearing sands with the maximum amplitude 884 occurring at approximately $\lambda/4.6$ (FIG. 8-8, 882), where $\lambda$ is the acoustic wavelength (e.g. 75% hydrate saturation, FIG. 8-4, 840 and FIG. 8-8, 882). The amplitudes start to decrease at $\lambda/4.6$ and significantly decrease 883 as the layer thins below approximately $\lambda/9.2$ (FIGS. 8-8, vertical line 881, for example). When hydrate saturation decreases, acoustic blanking and a phase reversal is predicted to occur (note the phase of the wavelet in the range between 50% and 0% hydrate saturation [wavelet 815 versus wavelet 825 versus wavelet 835], and weak amplitude response 865 at 25% hydrate saturation). For the Ricker wavelet, $\lambda/4.6$ is the apparent thickness (or tuning thickness) where the peak and trough of a convolving wavelet start to separate (Kallweit and Wood, 1982). In contrast to the Ricker wavelet, the tuning thickness is $\lambda/4$ for the Rayleigh wavelet used in Widess' experiments (Widess, 1973).

FIGS. 9-1 through 9-4 illustrate synthetic seismograms showing the seismic response due various free-gas-bearing sediment thicknesses of the wedge model, for example, wedge model 610 of model "b" geologic cross section 600. In particular, FIG. 9-1, seismogram 910, illustrates seismic response of a wedge model using 0% free-gas saturation. A seismic response wavelet 915 is labeled for reference. FIG. 9-2, seismogram 920, illustrates seismic response of a wedge model using 25% free-gas saturation. A seismic response wavelet 925 is labeled for reference. FIG. 9-3, seismogram 930, illustrates seismic response of a wedge model using 50% free-gas saturation. A seismic response wavelet 935 is labeled for reference. FIG. 9-4, seismogram 940, illustrates seismic response of a wedge model using 75% free-gas saturation.

In an example for model "(b)" 610 (FIGS. 9-1 through 9-4, seismograms 910, 920, 930, 940), high amplitudes start with low free-gas saturations and the highest amplitude occurs at the tuning thickness for a given gas saturation. Compared with amplitudes in water saturated sands above the tuning thickness (FIG. 9-1, seismogram 910, 0% gas saturation, wavelet 915, for example), the amplitudes at 25% gas saturation (FIG. 9-2, seismogram 920) can be clearly recognized at approximately $\lambda/9.2$ at wavelet 925. The phase does not change significantly as the layer thins.

In an example for model "(c)" 710 (FIGS. 10-1 through 10-4, seismograms 1010, 1020, 1030, 1040), a gas hydrate layer with variable saturations and thickness is underlain by a free-gas-bearing zone with uniform free-gas saturations of 30%. The strong amplitude response can be seen at the interface between gas hydrate and free gas, the type of reflection that causes a BSR (a "bottom simulating reflector"). For model "(c)", in the example of 50% gas hydrate saturation (FIG. 10-3, seismogram 1030), the amplitude at the top of a thick gas hydrate layer (FIG. 10-3, seismogram 1030, at 1035) is significantly weaker than at the bottom of the gas hydrate layer (FIG. 10-3, seismogram 1030, at 1036). The weak amplitude 1035 (weak wavelet about 20 ms above the strong wavelet) could easily be missed by the interpreter as the top of the thick, highly saturated gas hydrate sand section.

In an example for model "(a)" 510 (FIGS. 8-1 through 8-4, seismograms 810, 820, 830, 840), at the tuning thickness ($\lambda/4.6$) (FIGS. 8-5 through 8-8, 852), the gas hydrate reflection is seen as a relative strong waveform peak at the upper boundary (FIG. 8-4, seismogram 840, wavelet 845) over a relative strong waveform trough at the base (FIG. 8-4, seismogram 840, wavelet 846) at high gas hydrate saturations (e.g. 75% hydrate saturation, model "(a)", FIG. 8-4, seismogram 840).

For model "(c)" 710 (FIGS. 10-1 through 10-4, seismograms 1010, 1020, 1030, 1040) containing a gas hydrate interval with 30% gas saturation beneath it, the seismic waveform responses for gas hydrate are fairly similar in all four cases (FIGS. 10-1 through 10-4, seismograms 1010, 1020, 1030, 1040). However, the waveform troughs at the base boundary are strongly affected by the seismic responses of the free-gas beneath the gas hydrate layer, which shows constant high amplitudes as the thickness of the layer varies. Thus, peak-to-trough ratio is a good indicator to separate hydrate-bearing sand (over water) and hydrate-over-free-gas-bearing sand.

The fundamental principles of bed thickness estimation are presented by Partyka (2001, 2005). In general, the thickness of a thin bed can be derived in the frequency domain by spectral decomposition of seismic traces and wavelets derived from these traces. A reflectivity series has a spectral expression in the frequency domain derived from the spectral signature of the seismic trace divided by the spectral signature of the wavelet. Usually, reflectivities consist of a series of spikes in time domain, but their amplitude spectrum is broadband in the frequency domain. The amplitude drops to zero if there is no reflectivity coefficient or equal strength coefficients at an interface couplet. In some examples, the zero or low amplitude fields in the wedge models indicate the periodicity of amplitude bands. The thickness of the thin bed is estimated from the periodicities and amplitude strength because the two-way traveltime through the thin bed is inversely proportional to the bed thickness (Okaya, 1995).

Figures 1, 11:
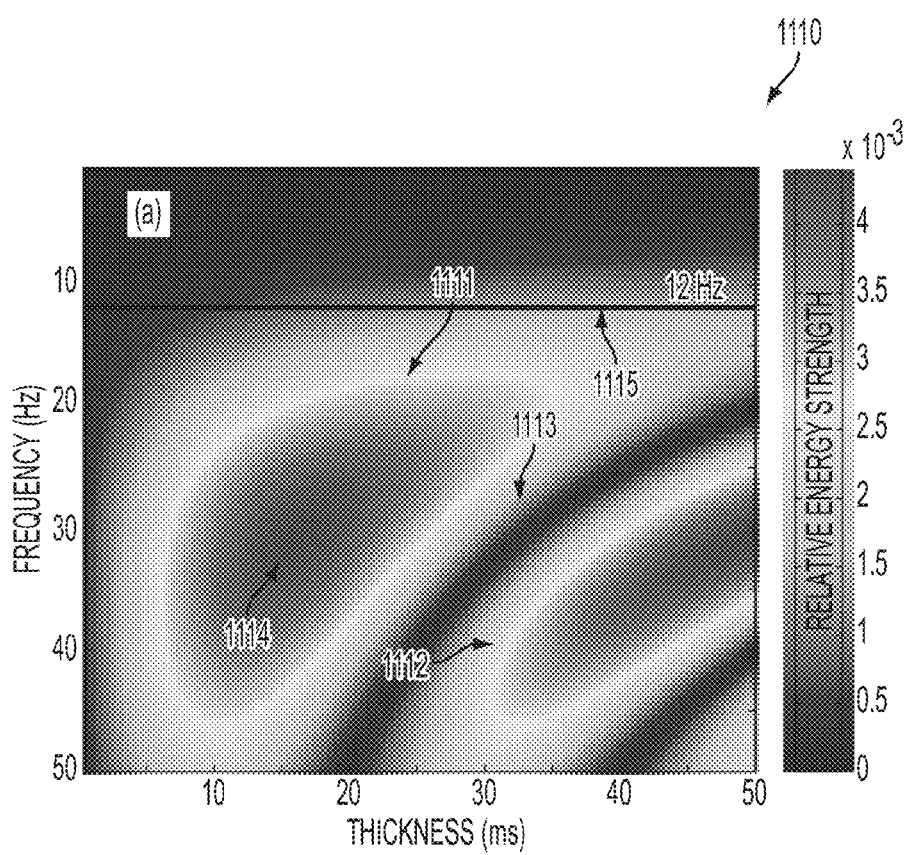
Figures 2, 11:
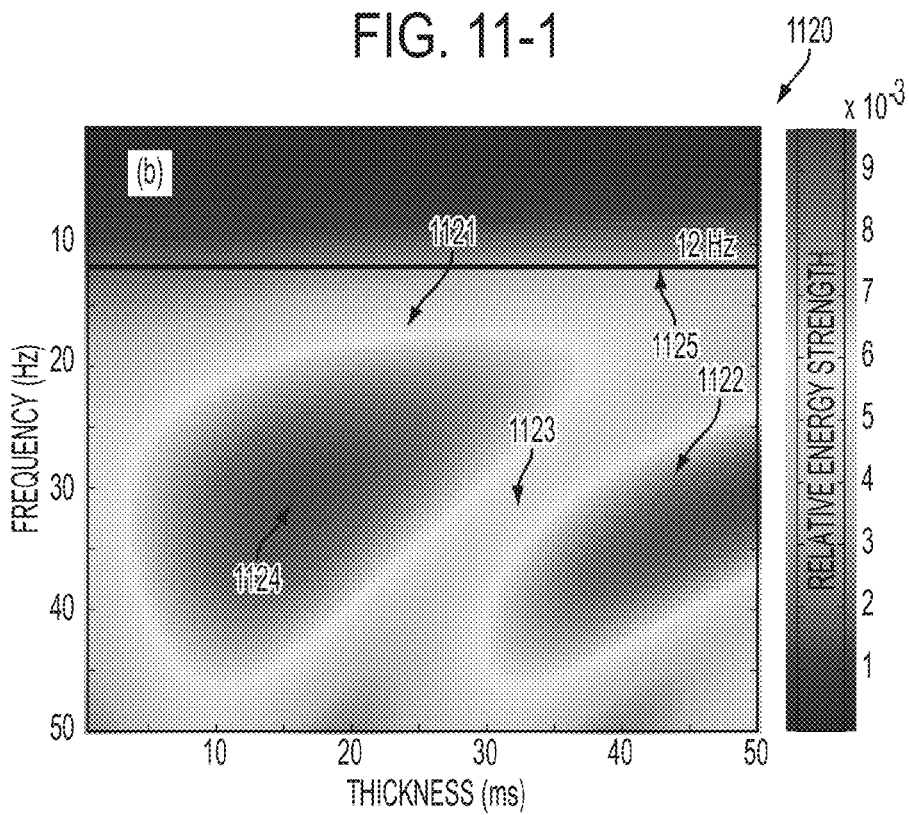

FIGS. 11-1 and 11-2 illustrate a frequency versus thickness density plot of relative energy strength based on Fourier spectra of the generated synthetic seismogram.

FIG. 11-1 illustrates a frequency versus thickness density plot 1110 based on the Fourier spectra of the model "(a)" 507 with 75% hydrate saturation (FIG. 8-4, seismogram 840).

FIG. 11-2 illustrates a frequency versus thickness density plot 1120 based on the Fourier spectra of the model "(a)" 707 with 75% hydrate saturation over a 30% gas saturated sand (FIG. 10-4, seismogram 1040).

The various shading shows different energy levels in plot 1110 and plot 1120. In several examples, the amplitude spectrum for the models is computed from a Fourier transformation of the synthetic seismic data produced by convolving the reflectivity in the models with a 30 Hz Ricker wavelet. In examples, the images 1110, 1120 show two uniform distributions of elongate or circular features (1111, 1112 and 1121, 1122) that vary in shape and size. The fields that have very low amplitude strengths or amplitude strengths close to zero are seen between the two distributions (shown at 1113 and 1123). The frequency at the fields corresponds to the thickness of the bed in the wedge model (frequency is inversely proportional to thickness). The maximum strength of spectral amplitude occurs, for example, at 30 Hz (shown at 1114 and 1124), which corresponds to the dominant frequency of the wavelet. The 12 Hz Fourier amplitude line is shown at 1115 and 1125.

Figures 1, 12:
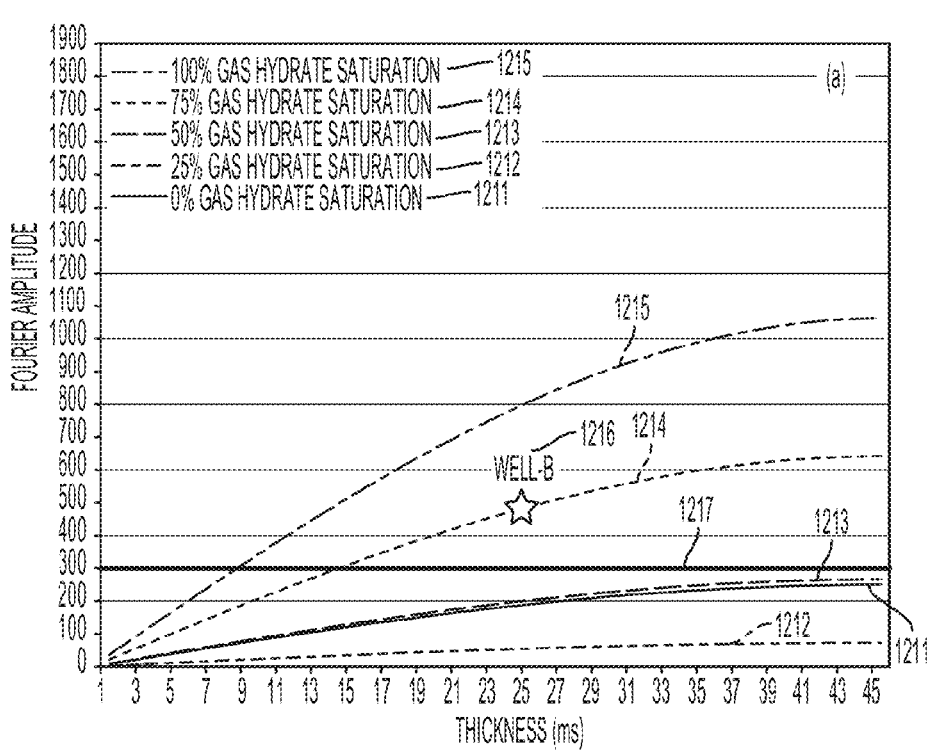
Figures 2, 12:
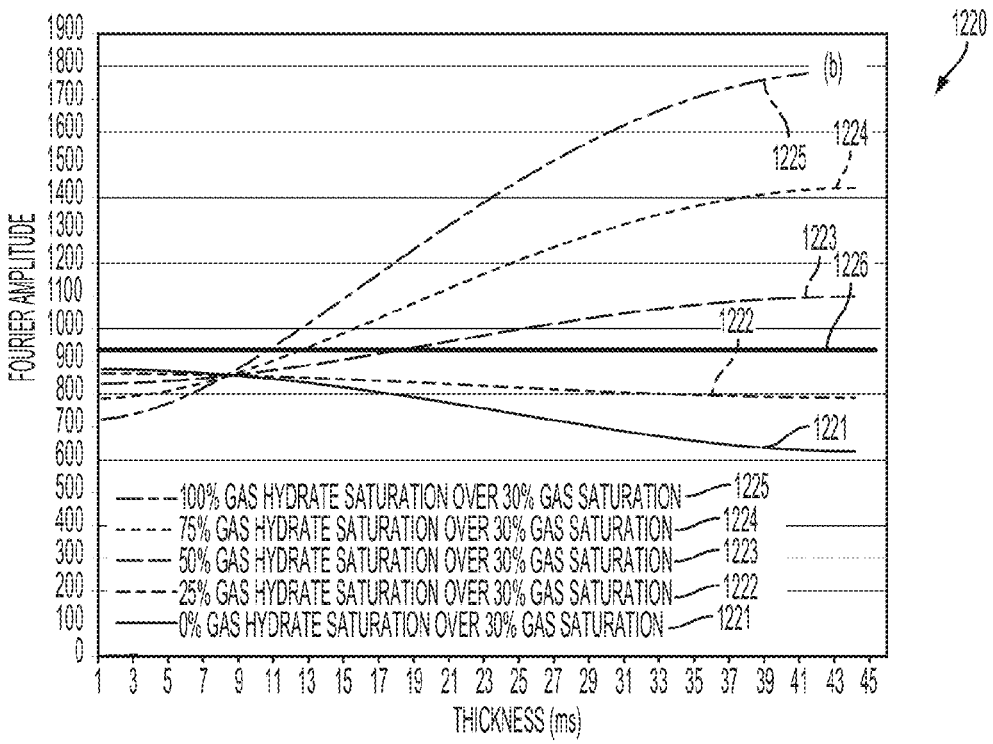

FIGS. 12-1 and 12-2 illustrate a 12 Hz Fourier amplitude versus thickness plots of relative energy strength based on Fourier spectra at 12 Hz of the generated synthetic seismograms.

FIG. 12-1 illustrates a 12 Hz Fourier amplitude versus thickness plot "(a)" 1210 based on the Fourier spectra at 12 Hz of the model "(a)" 500 with curves for 0% through 100% gas hydrate saturation. The vertical axis of plot 1210 represents Fourier amplitude and the horizontal axis of plot 1210 represents thickness of gas-hydrate-bearing sediment of wedge 510 in ms (milliseconds). Amplitude versus thickness curve 1211 represents Fourier amplitude response at 12 Hz versus wedge thickness of 0% hydrate bearing sediments, for example from seismogram 810. Amplitude versus thickness curve 1212 represents Fourier amplitude response at 12 Hz versus wedge thickness of 25% hydrate bearing sediments, for example from seismogram 820. Amplitude versus thickness curve 1213 represents Fourier amplitude response at 12 Hz versus wedge thickness of 50% hydrate bearing sediments, for example from seismogram 830. Amplitude versus thickness curve 1214 represents Fourier amplitude response at 12 Hz versus wedge thickness of 75% hydrate bearing sediments, for example from seismogram 840. Amplitude versus thickness curve 1215 represents Fourier amplitude response at 12 Hz versus wedge thickness of 100% hydrate bearing sediments.

In one example, the amplitudes are normalized with a calibration point 1216 derived from the well log data in the well (shown as a star in FIG. 12-1, plot 1210, point 1216). In one example, the amplitudes at 12 Hz are selected to establish relationships with gas hydrate saturations and thickness, focusing interest in characterization of the thick gas hydrate layers. At the relatively lower frequency, the strength of spectral amplitude is relatively stable and the strength increases more slowly as the bed thickness increases. The maximum bed thickness corresponding to the 12 Hz (line 1115 shown in density plot 1110 of FIG. 11-1) is approximately 45 ms thickness (FIG. 12-1, plot 1210). The discrete Fourier amplitudes increase with increasing layer thickness and hydrate saturation. Note, that a straight line 1217 has a Fourier amplitude of 300 in plot 1210 of FIG. 12-1. The amplitude of the wavelet for the hydrate layers containing 50% gas hydrate saturation or less would be less than 300 (figure for example, 25% curve 1212 and 0% curve 1211). Thus, in one example, the amplitude value of 300 is used as a reference amplitude, with amplitude responses greater than 300 being interpreted as thick highly concentrated gas hydrate layer. For example, if hydrate saturation is 75%, the thickness of a hydrate layer at 12 Hz is 19 m (14 ms TWT).

FIG. 12-2 illustrates a 12 Hz Fourier amplitude versus thickness plot "(b)" 1220 based on the Fourier spectra at 12 Hz of the model "(c)" 700 with curves for 0% through 100% gas hydrate saturation with 30% free gas saturation below the gas hydrate-bearing layer. The vertical axis of plot 1220 represents Fourier amplitude and the horizontal axis of plot 1220 represents thickness of gas-hydrate-over-free-gas bearing sediment of wedge 710 in ms (milliseconds). Amplitude versus thickness curve 1221 represents Fourier amplitude response at 12 Hz versus wedge thickness of 0% hydrate bearing sediments over 30% free gas, for example from seismogram 1010. Amplitude versus thickness curve 1222 represents Fourier amplitude response at 12 Hz versus wedge thickness of 25% hydrate bearing sediments over 30% free gas, for example from seismogram 1020. Amplitude versus thickness curve 1223 represents Fourier amplitude response at 12 Hz versus wedge thickness of 50% hydrate bearing sediments over 30% free gas, for example from seismogram 1030. Amplitude versus thickness curve 1224 represents Fourier amplitude response at 12 Hz versus wedge thickness of 75% hydrate bearing sediments over 30% free gas, for example from seismogram 1040. Amplitude versus thickness curve 1225 represents Fourier amplitude response at 12 Hz versus wedge thickness of 100% hydrate bearing sediments over 30% free gas.

Plot 1220 of FIG. 12-2 shows an example of the normalized amplitude with respect to 12 Hz frequency with 30% free gas saturation below a gas hydrate-bearing layer with variable hydrate saturations. A straight line 1226 has a Fourier amplitude of 900 (FIG. 12-2, plot 1220, line 1226). Above the straight line 1226, the amplitudes start to increase with increasing thicknesses. Thus, in one example, the value of 900 is used as the reference amplitude for the case of hydrate over free gas, which is a hydrate layer 19 m thick (16.2 ms TWT) if hydrate saturation is 50%.

Figures 1, 13:
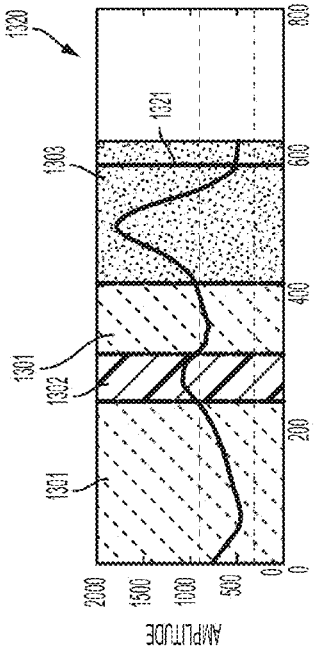
Figures 2, 13:
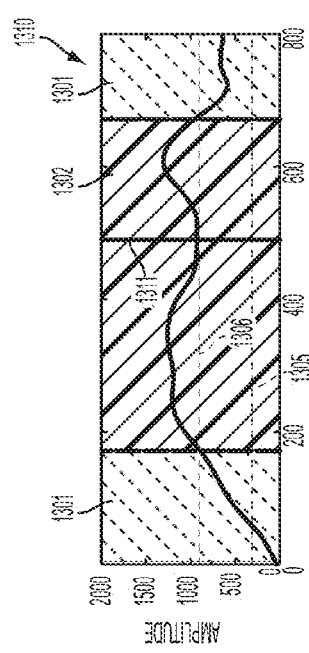
Figures 3, 13:
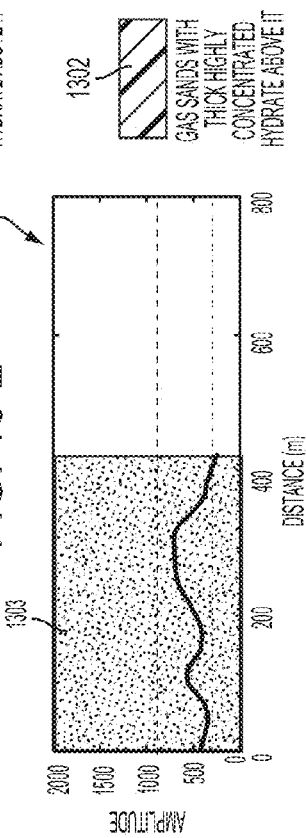
Figures 4, 13:
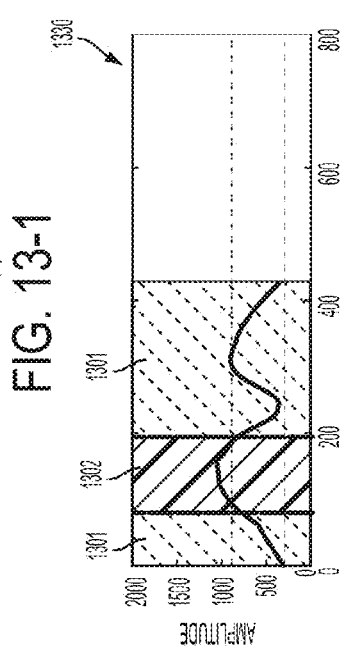
Figures 5, 13:
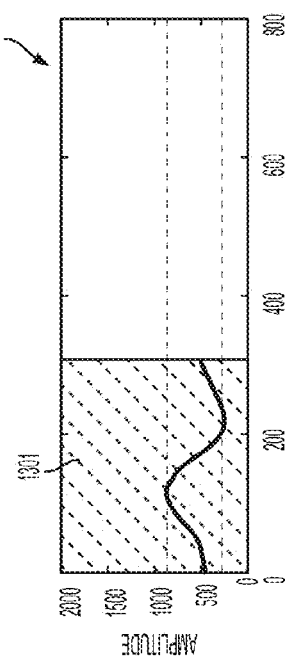
Figures 6, 13:
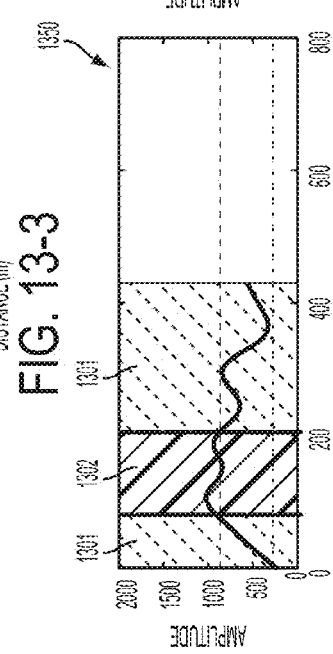

FIGS. 13-1 through 13-6 illustrate cross-section view normalized amplitudes of the waveform peak reflector for the interpreted top of the gas hydrate-bearing layer versus lateral distance, each cross section representing a (vertical) zone of interest. The vertical axis of each cross section 1310, 1320, 1330, 1340, 1350, 1360 represents amplitude and the horizontal axis represents lateral distance in meters.

Cross sections 1310, 1320, 1330, 1340, 1350, 1360 illustrate an example of seismic interpreted hydrate layer and hydrate with/without free gas beneath it in six identified zones inferred from the 12 Hz dominated frequency sub-band (from FIGS. 12-1 and 12-2). A series of cross sections 1310, 1320, 1330, 1340, 1350, 1360 for six example zones of interest is illustrated with the normalized amplitudes of the waveform peak reflector for the interpreted top of the gas hydrate-bearing layer plotted across the six zones. In one example, maximum peak amplitudes are picked along the zones on the traces of a 12 Hz dominant frequency sub-band, which are, in one example, derived from Rock Solid Attributes in the KINGDOM software suite (Stanley, 2008). In one example, the peak amplitudes are proportional to the normalized amplitude by calibrating with the LWD-derived gas hydrate saturations in the well (for example, shown as a star in FIG. 12-1, plot 1210, point 1216).

Cross section 1310 ("zone 1") further identifies location of a well with vertical line 1311 at approximately 480 m on the horizontal axis. Cross section 1320 ("zone 2") further identifies location of a well with vertical line 1321 at approximately 590 m on the horizontal axis. From the plot of normalized amplitudes of the waveform peak reflector for the interpreted top of the gas hydrate-bearing layer, three classifications are identified in cross sections 1310, 1320, 1330, 1340, 1350, 1360: one class 1301, gas sands with/without thin high concentration hydrate or thick low concentration hydrate above it; one class 1302, gas sands with thick highly concentrated hydrate about it; and one class 1303, thick highly concentrated hydrate-bearing sands. Normalized reference amplitude value 300 is noted with dotted horizontal line 1305. Normalized reference amplitude value 900 is noted with dotted horizontal line 1306.

Cross sections 1310, 1320, 1330, 1340, 1350, 1360 also depict an example of the seismic-inferred occurrence of gas hydrate and free gas, as modeled. In examples, amplitude and waveform analyses are performed and used to interpret the occurrence and characterization of gas hydrate and free gas. In further examples, normalized amplitudes lower than the reference amplitude of 900 (dotted horizontal line 1306) for model "(c)" 710 hydrate-bearing sediments are interpreted to be gas-bearing zones with/without thin hydrate-bearing layer above. In further examples, normalized amplitudes greater than the reference amplitude of 300 (dotted horizontal line 1305) for model "(a)" 510 hydrate-bearing sediments are interpreted to be thick hydrate-bearing layers without free gas below. In some examples, not all high amplitude reflectors correspond to thick, high saturated gas hydrate layers. For example, FIG. 13-6, cross section 1360 (zone 6), there are high amplitudes in zone 6, but the hydrate thickness in the zone is relatively thin.

Figures 1, 14:
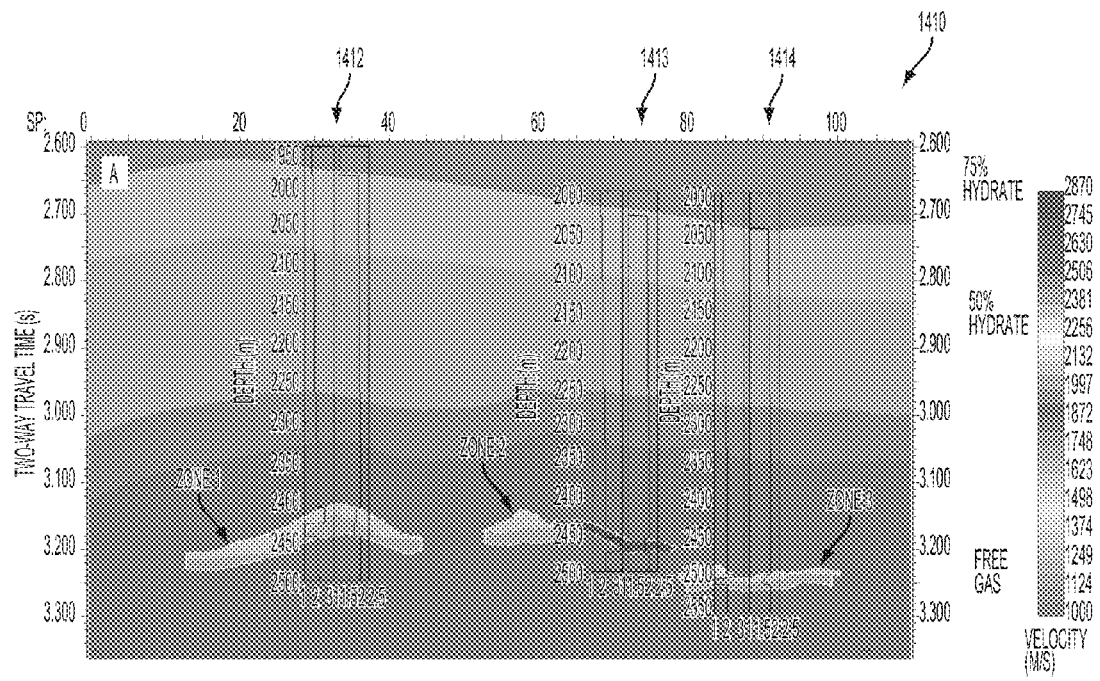
Figures 2, 14:
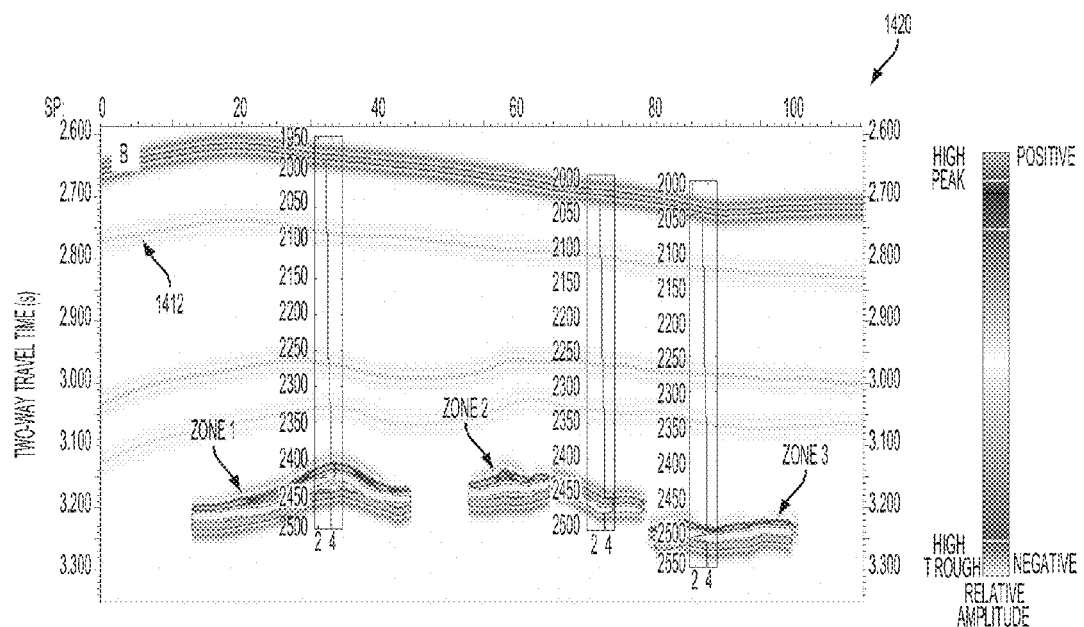

FIGS. 14-1 and 14-2 illustrate example synthetic stacked seismic sections with overlaying well log data.

FIG. 14-1 illustrates an example synthetic stacked seismic section with overlaying well log data and three prospective hydrate zones identified.

FIG. 14-2 illustrates an example synthetic stacked seismic section with overlaying well log data and three prospective hydrate zones identified, showing detail of the bedding in the zones.

FIGS. 14-1 and 14-2 illustrate an example synthetic stacked seismic section. In examples, 2D modeling is used to obtain the seismic responses in a sequence of thin and thick sand beds containing either gas hydrate at 50 or 70% saturation, or free gas at 30% saturation. The geologic model 1411, 1421 is generated based on the interpretation from seismic and logging data from the wells 1412, 1413, 1414. In one example, a 35 Hz Ricker wavelet is used in this geologic model. In further example, compressional-wave velocities of clay-rich sections are derived from logging data (FIG. 14-1, wells 1412, 1413, 1414). In one example, densities of the clay-rich sections are calculated from a modified Gardner's equation by calibrating with well log data. In further example, within the sand-rich zones, the elastic parameters for variable gas hydrate and free-gas saturations are computed from the constructed rock physics model.

In examples, estimated well-log- and model-derived velocity and density distributions are input into Hampson-Russell's AVO modeling package (Russell et al., 2001). The synthetic amplitudes are computed from Zoeppritz equations in the ray-tracing modeling algorithm. In further example, NMO correction is applied in the final model. In some examples, effects of converted waves, inelasticity, and anisotropy are not considered in the model. In examples, synthetic data generated from the model data exhibits well the characteristics of amplitude and waveform at the top of seismic-inferred sand layers with various hydrate saturations and layer thicknesses (FIG. 14-2).

Figure 15:
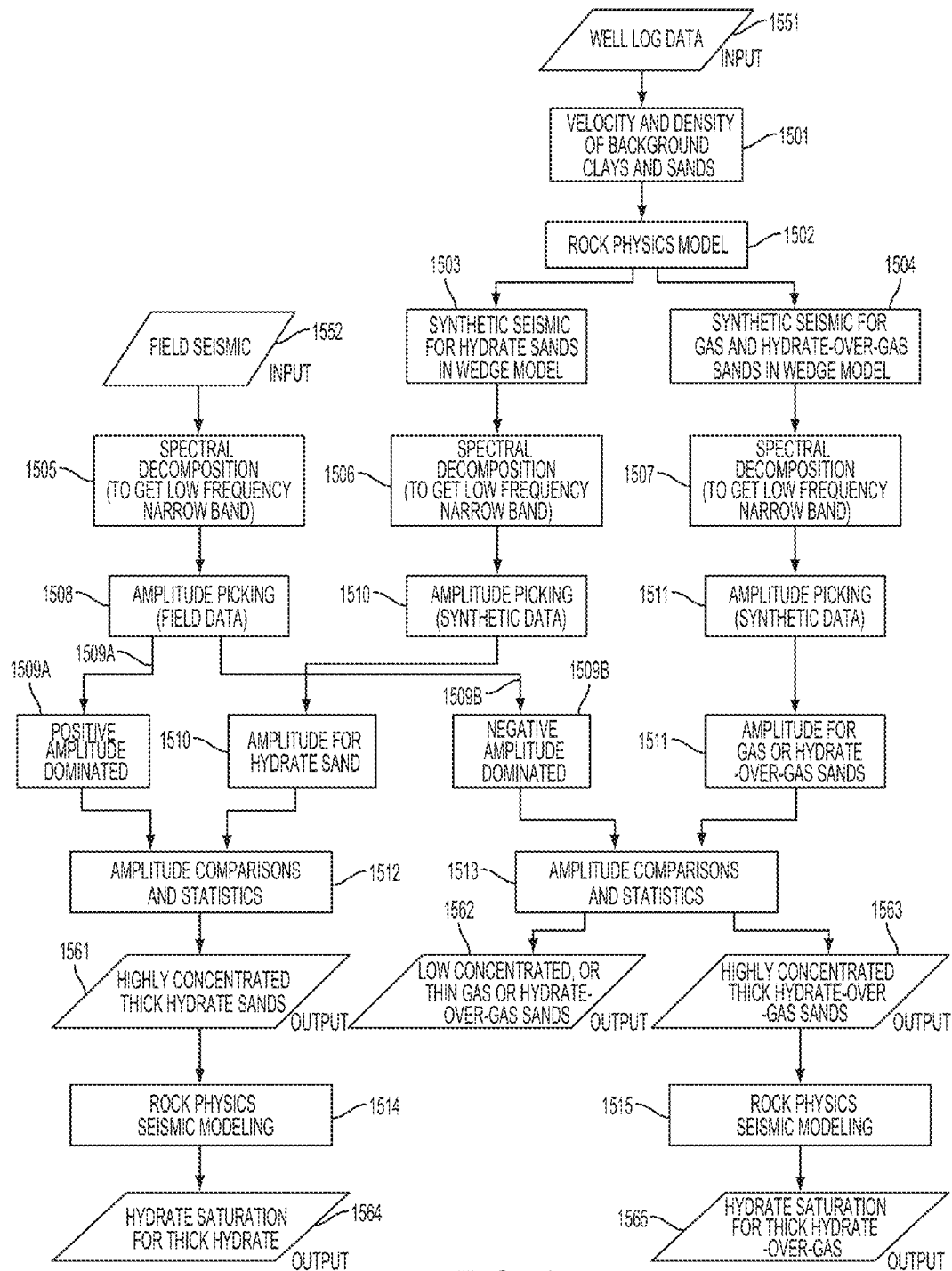
FIG. 15 illustrates a flowchart example of a quantitative interpretation method for free gas, gas hydrate, and gas hydrate over free gas.

FIG. 15 illustrates an example quantitative interpretation method for free gas, gas hydrate, and gas hydrate over free gas. Well log data 1551 and field seismic data 1552 are input. In one example, the seismic is zero-phase or zero-phase adjusted and North American polarity convention is used (positive amplitude indicating increase in impedance at an interface). Extract velocities and densities (step 1501) of background clays and target sands from well log data. Compute velocities and densities (step 1502) of gas charged sands, hydrate bearing sands, and hydrate-over-gas sands with respect to hydrate saturation and gas saturation from rock physics model. Compute synthetic seismic seismograms (step 1503) for wedge sand models with various hydrate saturations (hydrate-bearing sands) by using the velocities and densities above and wavelet of the same dominated frequency as field data. Compute synthetic seismic seismograms (step 1504) for wedge sand models with various hydrate saturations and an amount of free gas under the hydrate (hydrate-over-gas sands) by using the velocities and densities above and wavelet of the same dominated frequency as field data. Perform spectral decomposition (step 1505) to field seismic data 1552 to get a low frequency band, such as 15 Hz or 20 Hz. Perform spectral decomposition (step 1506) to synthetic seismograms of hydrate bearing sands to get a low frequency band, such as 15 Hz or 20 Hz. Perform spectral decomposition (step 1507) for synthetic seismograms of hydrate-over-gas sands to get a low frequency band, such as 15 Hz or 20 Hz. Map possible sand layers and pick amplitude (step 1508) with maximum positive amplitude in the low frequency band field data. Divide the picked amplitudes (step 1509) into two classes: positive amplitude with weaker negative amplitude just below it (positive amplitude dominated) 1509A and positive amplitude with stronger negative amplitude (negative amplitude dominated) 1509B. Extract maximum positive amplitude (step 1510) for the low frequency band synthetic seismic for hydrate bearing sands with the same frequency band as field data. Extract maximum positive amplitude (step 1511) for the low frequency band synthetic seismic for free gas sands and hydrate-over-gas sands with the same frequency band as field data. In one example, it can be appreciated that an equivalent classification to "positive amplitude dominated" and "negative amplitude dominated" can be performed where non-zero-phase data and/or different polarity convention is used. (For non-zero phase seismic data or synthetic seismograms an extraction step equivalent to extracting a positive amplitude followed by a negative amplitude can be applied.) Compare the extracted amplitude (step 1512) of the synthetic seismic of hydrate bearing sands with field data, then, compute the possibility of highly concentrated thick hydrate sands. Output 1561 includes identification or interpretation of highly concentrated thick hydrate sands. Compare the extracted amplitude (step 1513) of synthetic seismic of gas charged sands and hydrate-over-gas sands with field data, then, compute the possibility of gas charged sands or highly concentrated thick hydrate-over-gas sands. Output 1562, 1563 includes identification or interpretation of: (a) low concentrated, or thin gas or thin hydrate-over-gas sands 1562, and/or (b) highly concentrated thick hydrate-over-gas sands 1563. Compute hydrate saturation (step 1514) for thick hydrate by using rock physics seismic modeling. Compute hydrate saturation (step 1515) for thick hydrate-over-gas by using rock physics seismic modeling. Outputs 1564, 1565 include hydrate saturation for thick hydrate 1564 and hydrate saturation for thick hydrate-over-gas 1565.

The examples showing integration of rock physics modeling, amplitude analysis, and spectral decomposition improve identification and characterization of the presence of gas hydrate and free gas in an exploratory area of interest. The interaction of varying gas hydrate saturations, reservoir thicknesses, and free gas occurrence generates a complex expression in seismic profiles across the exploratory area. In general, low amplitude peak events occur in the low saturation hydrate-bearing sands and high amplitude peak events occur in highly saturated hydrate-bearing sands. The amplitude response, however, is more complicated in a mixed-layer gas hydrate and free-gas system.

In further examples, spectral decomposition of conventional exploration seismic data, guiding by the proper rock physics model, provides an effective, quantitative prospecting method to identify thick, high saturated gas-hydrate-bearing sand layers. The results of this characterization of a combined gas hydrate and free-gas system are useful examples of methods that allow interpreters to identify gas hydrate reservoirs from seismic data in similar environments. Additionally, in further example of applying the methods disclosed herein, the study of shallow free-gas using these methods are applicable to improve the quantitative identification of potential shallow gas accumulations in pre-drilling geohazard assessments.

In a summary example, presented is a method for prospecting for gas hydrates that includes: constructing a model of physical parameters representing a geology; generating two sets of synthetic seismograms from the model, a first set for gas hydrates, and a second set for gas hydrates having an amount of free gas under the hydrate; applying spectral decomposition to a seismic data set, whereby the seismic data set is narrow-band-limited by the application of spectral decomposition; applying spectral decomposition to the first set of synthetic seismograms, whereby the first set of synthetic seismograms is narrow-band-limited by the application of spectral decomposition; applying spectral decomposition to the second set of synthetic seismograms to narrow-band-limit the second set of synthetic seismograms, whereby the second set of synthetic seismograms is narrow-band-limited by the application of spectral decomposition; identifying locations of a target sand in the narrow-band-limited seismic data, extracting a portion of the narrow-band-limit seismic data at the identified locations; classifying the extracted portions based on whether a first phase characteristic or a second phase characteristic of the extracted portion is dominant; and for extracted portions where the first phase characteristic is dominant, comparing the extracted portions with the first set of narrow-band-limited synthetic seismograms, and selecting the synthetic seismogram of the first set having the best match, whereby gas hydrate saturation is identified; and for extracted portions where the second phase characteristic is dominant, comparing the extracted portions with the second set of narrow-band-limited synthetic seismograms, and selecting the synthetic seismogram of the second set having the best match, whereby gas hydrate saturation and associated free gas is identified.

From the description contained herein, the features of any of the examples, especially as set forth in the claims, can be combined with each other in any meaningful manner to form further examples and/or embodiments. It is to be further appreciated that, in some examples, some or all method steps are executed automatically by a programmable computer system.

It is to be further appreciated that vertical distances in models and used in synthetic generation, in further examples, may be expressed in either time (t) or depth (z) through conversion using a known or assumed velocity conversion model.

It is contemplated that in further examples, the invention, including each of the aforementioned methods and examples, is practiced on a computer system specifically configured to execute the processing steps required to analyze and produce displays of the resulting data. In one example, the invention is practiced on a computer system specifically configured to execute the processing steps required to analyze and produce an output data set that may be stored and used at a later time for prospecting and/or shallow hazard investigation purposes. In a particular example, the specially produced output data set is formatted into a set of 2-D or 3-D traces of type similar to seismic data trace sets or volumes used for seismic interpretation work. In further example, the processing steps required to configure the computer system are placed in the form of programming code executable by a computing device, the programming code placed on a tangible, non-transient media that is readable by a computer system.

The foregoing description is presented for purposes of illustration and description, and is not intended to limit the invention to the forms disclosed herein. Consequently, variations and modifications commensurate with the above teachings and the teaching of the relevant art are within the spirit of the invention. Such variations will readily suggest themselves to those skilled in the relevant structural or mechanical art. Further, the embodiments described are also intended to explain the best mode for practicing the invention, and to enable others skilled in the art to utilize the invention and such or other embodiments and with various modifications required by the particular applications or uses of the invention.

We claim:

1. A method for identifying gas hydrate saturation and associated free gas comprising:

receiving, at a processor, well log data of a well captured from within the well;

receiving, at the processor, a field seismic data set of and adjacent to the well captured from above the well;

constructing a velocity-density-thickness model of background clays and target sand based on the well log data, initially setting the target sand as saturated with water;

generating two sets of synthetic seismograms, a first set based on varying the sand thicknesses and hydrate saturation in the target sand of the model, and a second set based on varying the sand thickness, hydrate saturation, and an amount of free gas under the hydrate, in the target sand of the model;

applying spectral decomposition to the field seismic data set of the target sand, whereby the seismic data set is narrow-band-limited by the application of spectral decomposition;

applying spectral decomposition to the first set of synthetic seismograms, whereby the first set of synthetic seismograms is narrow-band-limited by the application of spectral decomposition;

applying spectral decomposition to the second set of synthetic seismograms to narrow-band-limit the second set of synthetic seismograms, whereby the second set of synthetic seismograms is narrow-band-limited by the application of spectral decomposition;

identifying locations of the target sand in the narrow-band-limited seismic data, extracting a positive amplitude followed by a negative amplitude of the narrow-band-limit seismic data at the identified locations, the polarity convention relative to zero phase data, positive indicating increasing impedance;

classifying the extracted amplitudes based on whether the positive amplitude or the negative amplitude is dominant;

for extracted amplitudes where the positive amplitude is dominant, comparing the extracted amplitudes with the first set of narrow-band-limited synthetic seismograms, and selecting the synthetic seismogram having the best match in thickness and amplitude to the extracted amplitude, whereby gas hydrate saturation is identified;

for extracted amplitudes where the negative amplitude is dominant, comparing the extracted amplitudes with the second set of narrow-band-limited synthetic seismograms, and selecting the synthetic seismogram having the best match in thickness and amplitude to the extracted amplitude, whereby gas hydrate saturation and associated free gas is identified.

2. The method of claim 1 wherein the two sets of synthetic seismograms are generated based on the dominant frequency of the field seismic data set.

3. The method of claim 1 wherein the applying spectral decomposition to the first set of synthetic seismograms is based on a frequency characteristic of the narrow-band-limited seismic data set.

4. The method of claim 1 wherein the applying spectral decomposition to the second set of synthetic seismograms is based on a frequency characteristic of the narrow-band-limited seismic data set.

5. The method of claim 1 wherein, for extracted amplitudes where the positive amplitude is dominant, mapping the corresponding associated hydrate thickness and saturation represented by the selected synthetic seismogram to the field data location of the respective extracted amplitude.

6. The method of claim 1 wherein, for extracted amplitudes where the negative amplitude is dominant, mapping the corresponding associated hydrate thickness and saturation and free gas amount represented by the selected synthetic seismogram to the field data location of the respective extracted amplitude.

7. The method of claim 1 wherein the second set of synthetic seismograms comprise at least one synthetic seismogram having zero hydrate.

8. The method of claim 1 wherein constructing a model comprises assuming the sedimentary section to be an isotropic composite media of porous rock with isotropic mineral and fluid components, and gas hydrate.

9. The method of claim 1 wherein constructing a model comprises using the Hashin-Shtrikman lower bound to simulate elastic moduli of hydrate bearing sediments.

10. The method of claim 1 wherein constructing a model comprises using the Reuss average of hydrate and mineral components as higher limit of bound to simulate elastic moduli of hydrate bearing sediments.

11. The method of claim 1 wherein constructing a model comprises using the Lee and Waite parameter (c) provided by Lee and Waite to describe both pore-filling and grain-contacted behavior.

12. The method of claim 1 wherein constructing a model comprises using the Walton smooth model to predict the elastic moduli of the dry rock matrix.

13. The method of claim 1 wherein constructing a model comprises using Gassmann's equation to predict the elastic moduli of fully water saturated sediment.

14. The method of claim 1 wherein constructing a model comprises using the Hashin-Shtrikman lower bound to compute the elastic moduli of the hydrated-bearing sands for hydrate present in the pore space.

15. The method of claim 1 wherein constructing a model comprises using Gassmann's equation to calculate elastic moduli of the free-gas-bearing sands for free gas present in the pore space.

16. The method of claim 1 wherein constructing a model comprises assuming uniform gas distribution and computing the fluid bulk modulus from the Reuss average of water and gas bulk moduli.

17. The method of claim 1 wherein constructing a model comprises computing the compressional-wave and shear-wave velocities from the well-log-derived moduli and densities.

18. A computing system configured with executable programming code stored on a non-transient medium, executable to:
receive well log data of a well captured from within the well;
receive a field seismic data set of and adjacent to the well captured from above the well;
receive user input for, and constructing therefrom a velocity-density-thickness model of background clays and target sands based on the well log data and assuming that the target sands are saturated with water;
receive user input for, and generating therefrom two sets of synthetic seismograms, a first set based on varying the sand thicknesses and hydrate saturation in the target sands of the model, and a second set based on varying the sand thickness, hydrate saturation, and an amount of free gas under the hydrate, in the target sands of the model;
receive user input for, and applying therefrom spectral decomposition to the field seismic data set of the target sands, to narrow-band-limit the seismic data set;
receive user input for, and applying therefrom spectral decomposition to the first set of synthetic seismograms to narrow-band-limit the first set of synthetic seismograms, in one preferred example, based on a frequency characteristic of the narrow-band-limited seismic data set;
receive user input for, and applying therefrom spectral decomposition to the second set of synthetic seismograms to narrow-band-limit the second set of synthetic seismograms;
receive user input for, and identifying therefrom the locations of the target sand in the narrow-band-limited field seismic data, extracting a positive amplitude followed by a negative amplitude of the narrow-band-limit seismic data at the identified locations, the polarity convention relative to zero phase data, positive indicating increasing impedance;
receive user input for, and classifying therefrom the extracted amplitudes based on whether the positive amplitude or the negative amplitude is dominant;
for extracted amplitudes where the positive amplitude is dominant, compare the extracted amplitudes with the first set of narrow-band-limited synthetic seismograms, and select the synthetic seismogram having the best match in thickness and amplitude to the extracted amplitude, and
for extracted amplitudes where the negative amplitude is dominant, compare the extracted amplitudes with the second set of narrow-band-limited synthetic seismograms, and select the synthetic seismogram having the best match in thickness and amplitude to the extracted amplitude.

19. The computing system of claim 18 configured with executable programming code stored on a non-transient medium, executable to generate the two sets of synthetic seismograms based on the dominant frequency of the field seismic data set.

20. The method of claim 18 configured with executable programming code stored on a non-transient medium, executable to apply spectral decomposition to the first set of synthetic seismograms based on a frequency characteristic of the narrow-band-limited seismic data set.

21. The method of claim 18 configured with executable programming code stored on a non-transient medium, executable to apply spectral decomposition to the second set of synthetic seismograms based on a frequency characteristic of the narrow-band-limited seismic data set.

22. The computing system of claim 18 configured with executable programming code stored on a non-transient medium, executable to map the corresponding associated hydrate thickness and saturation represented by the selected synthetic seismogram to the field data location of the respective extracted amplitude.

23. The computing system of claim 18 configured with executable programming code stored on a non-transient medium, executable to map the corresponding associated hydrate thickness and saturation and free gas amount represented by the selected synthetic seismogram to the field data location of the respective extracted amplitude.

24. The computing system of claim 18 configured with executable programming code stored on a non-transient medium, executable to generate the second set of synthetic seismograms comprising at least one synthetic seismogram having zero hydrate.

25. The computing system of claim 18 configured with executable programming code stored on a non-transient medium, executable to construct the model assuming the sedimentary section to be an isotropic composite media of porous rock with isotropic mineral and fluid components, and gas hydrate.

26. The computing system of claim 18 configured with executable programming code stored on a non-transient medium, executable to construct the model using the Hashin-Shtrikman lower bound to simulate elastic moduli of hydrate bearing sediments.

27. The computing system of claim 18 configured with executable programming code stored on a non-transient medium, executable to construct the model using the Reuss average of hydrate and mineral components as higher limit of bound to simulate elastic moduli of hydrate bearing sediments.

28. The computing system of claim 18 configured with executable programming code stored on a non-transient medium, executable to construct the model using the Lee and Waite parameter (c) provided by Lee and Waite to describe both pore-filling and grain-contacted behavior.

29. The computing system of claim 18 configured with executable programming code stored on a non-transient medium, executable to construct the model using the Walton smooth model to predict the elastic moduli of the dry rock matrix.

30. The computing system of claim 18 configured with executable programming code stored on a non-transient medium, executable to construct the model using Gassmann's equation to predict the elastic moduli of fully water saturated sediment.

31. The computing system of claim 18 configured with executable programming code stored on a non-transient medium, executable to construct the model using the Hashin-Shtrikman lower bound to compute the elastic moduli of the hydrated-bearing sands for hydrate present in the pore space.

32. The computing system of claim 18 configured with executable programming code stored on a non-transient medium, executable to construct the model using Gassmann's equation to calculate elastic moduli of the free-gas-bearing sands for free gas present in the pore space.

33. The computing system of claim 18 configured with executable programming code stored on a non-transient medium, executable to construct the model assuming uniform gas distribution and computing the fluid bulk modulus from the Reuss average of water and gas bulk moduli.

34. The computing system of claim 18 configured with executable programming code stored on a non-transient medium, executable to construct the model comprising computing the compressional-wave and shear-wave velocities from the well-log-derived moduli and densities.

35. A non-transitory tangible computer readable medium having computer executable logic recorded thereon, comprising:
   code for receiving well log data of a well captured from within the well;
   code for receiving a field seismic data set of and adjacent to the well captured from above the well;
   code for receiving user input for, and constructing therefrom a velocity-density-thickness model of background clays and target sands based on the well log data and assuming that the target sands are saturated with water;
   code for receiving user input for, and generating therefrom two sets of synthetic seismograms, a first set based on varying the sand thicknesses and hydrate saturation in the target sands of the model, and a second set based on varying the sand thickness, hydrate saturation, and an amount of free gas under the hydrate, in the target sands of the model;
   code for receiving user input for, and applying therefrom spectral decomposition to the field seismic data set of the target sands, to narrow-band-limit the seismic data set;
   code for receiving user input for, and applying therefrom spectral decomposition to the first set of synthetic seismograms to narrow-band-limit the first set of synthetic seismograms, in one preferred example, based on a frequency characteristic of the narrow-band-limited seismic data set;
   code for receiving user input for, and applying therefrom spectral decomposition to the second set of synthetic seismograms to narrow-band-limit the second set of synthetic seismograms, in one preferred example, based on a frequency characteristic of the narrow-band-limited seismic data set;
   code for receiving user input for, and identifying therefrom the locations of the target sands in the narrow-band-limited field seismic data, extracting a positive amplitude followed by a negative amplitude of the narrow-band-limit seismic data at the identified locations;
   code for receiving user input for, and classifying therefrom the extracted amplitudes based on whether the positive amplitude or the negative amplitude is dominant;
   for extracted amplitudes where the positive amplitude is dominant, code for comparing the extracted amplitudes with the first set of narrow-band-limited synthetic seismograms, and code for selecting the synthetic seismogram having the best match in thickness and amplitude to the extracted amplitude, and
   for extracted amplitudes where the negative amplitude is dominant, code for comparing the extracted amplitudes with the second set of narrow-band-limited synthetic seismograms, and code for selecting the synthetic seismogram having the best match in thickness and amplitude to the extracted amplitude.

36. The tangible computer readable medium of claim 35 comprising code to generate the two sets of synthetic seismograms based on the dominant frequency of the field seismic data set.

37. The tangible computer readable medium of claim 35 comprising code to apply spectral decomposition to the first set of synthetic seismograms based on a frequency characteristic of the narrow-band-limited seismic data set.

38. The tangible computer readable medium of claim 35 comprising code to apply spectral decomposition to the second set of synthetic seismograms based on a frequency characteristic of the narrow-band-limited seismic data set.

39. The tangible computer readable medium of claim 35 comprising code to map the corresponding associated hydrate thickness and saturation represented by the selected synthetic seismogram to the field data location of the respective extracted amplitude.

40. The tangible computer readable medium of claim 35 comprising code to map the corresponding associated hydrate thickness and saturation and free gas amount represented by the selected synthetic seismogram to the field data location of the respective extracted amplitude.

41. The tangible computer readable medium of claim 35 comprising code to generate the second set of synthetic seismograms comprising at least one synthetic seismogram having zero hydrate.

42. The tangible computer readable medium of claim 35 comprising code to construct the model assuming the sedimentary section to be an isotropic composite media of porous rock with isotropic mineral and fluid components, and gas hydrate.

43. The tangible computer readable medium of claim 35 comprising code to construct the model using the Hashin-Shtrikman lower bound to simulate elastic moduli of hydrate bearing sediments.

44. The tangible computer readable medium of claim 35 comprising code to construct the model using the Reuss average of hydrate and mineral components as higher limit of bound to simulate elastic moduli of hydrate bearing sediments.

45. The tangible computer readable medium of claim 35 comprising code to construct the model using the Lee and Waite parameter ($\epsilon$) provided by Lee and Waite to describe both pore-filling and grain-contacted behavior.

46. The tangible computer readable medium of claim 35 comprising code to construct the model using the Walton smooth model to predict the elastic moduli of the dry rock matrix.

47. The tangible computer readable medium of claim 35 comprising code to construct the model using Gassmann's equation to predict the elastic moduli of fully water saturated sediment.

48. The tangible computer readable medium of claim 35 comprising code to construct the model using the Hashin-Shtrikman lower bound to compute the elastic moduli of the hydrated-bearing sands for hydrate present in the pore space.

49. The tangible computer readable medium of claim 35 comprising code to construct the model using Gassmann's equation to calculate elastic moduli of the free-gas-bearing sands for free gas present in the pore space.

50. The tangible computer readable medium of claim 35 comprising code to construct the model assuming uniform gas distribution and computing the fluid bulk modulus from the Reuss average of water and gas bulk moduli.

51. The tangible computer readable medium of claim 35 comprising code to construct the model comprising computing the compressional-wave and shear-wave velocities from the well-log-derived moduli and densities.

* * * * *